US009235964B2

(12) United States Patent
Ward et al.

(10) Patent No.: US 9,235,964 B2
(45) Date of Patent: Jan. 12, 2016

(54) PROVIDING EXCLUSIVE GAMING FEATURES FOR MOBILE GAMING

(71) Applicant: WMS Gaming, Inc., Waukegan, IL (US)

(72) Inventors: Matthew J. Ward, Northbrook, IL (US); Allon G. Englman, Chicago, IL (US); Robert L. Kyte, Chicago, IL (US); Ali Neyestani, Chicago, IL (US); Dwight D. Sullivan, West Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 140 days.

(21) Appl. No.: 13/788,694

(22) Filed: Mar. 7, 2013

(65) Prior Publication Data

US 2014/0141864 A1 May 22, 2014

Related U.S. Application Data

(60) Provisional application No. 61/727,996, filed on Nov. 19, 2012.

(51) Int. Cl.
A63F 13/00 (2014.01)
G07F 17/34 (2006.01)
G07F 17/32 (2006.01)

(52) U.S. Cl.
CPC ............ *G07F 17/34* (2013.01); *G07F 17/3225* (2013.01)

(58) Field of Classification Search
CPC ............ G06F 17/3204; G06F 17/3206; G06F 17/3218; G06F 17/3223; G06F 17/3227; G06F 17/3276

USPC ......................... 463/16, 20, 25, 29, 39, 42, 47
See application file for complete search history.

(56) References Cited

U.S. PATENT DOCUMENTS

| 8,133,106 | B2 | 3/2012 | Englman | |
|---|---|---|---|---|
| 8,550,903 | B2 | 10/2013 | Lyons et al. | |
| 2004/0132523 | A1* | 7/2004 | Staw | 463/16 |
| 2006/0189382 | A1* | 8/2006 | Muir et al. | 463/29 |
| 2010/0105470 | A1 | 4/2010 | Englman | |

(Continued)

FOREIGN PATENT DOCUMENTS

| EP | 2608166 | 6/2013 |
|---|---|---|
| EP | 2608167 | 6/2013 |

(Continued)

*Primary Examiner* — James S McClellan
(74) *Attorney, Agent, or Firm* — DeLizio Law, PLLC

(57) ABSTRACT

A wagering game system and its operations are described herein. In some embodiments, the operations can include determining that a mobile device is activated to receive secondary wagering game content during a wagering game session conducted via a wagering game machine. In some embodiments, the wagering game machine is configured to present primary wagering game content during the wagering game session. In some embodiments, the operations further include selecting secondary wagering game content in response to determining that the mobile device is activated to receive the secondary wagering game content. In some embodiments, the secondary wagering game content provides a wagering game feature that is not available via the primary wagering game content. In some embodiments, the operations further include providing the secondary wagering game content for presentation via the mobile device during the wagering game session.

25 Claims, 14 Drawing Sheets

(56) References Cited

U.S. PATENT DOCUMENTS

| | | |
|---|---|---|
| 2010/0255912 A1 | 10/2010 | Ward et al. |
| 2011/0014971 A1 | 1/2011 | Ward et al. |
| 2011/0218033 A1 | 9/2011 | Englman et al. |
| 2012/0122558 A1* | 5/2012 | Lyons et al. ............... 463/25 |
| 2013/0053131 A1* | 2/2013 | Zielinski et al. ............ 463/25 |
| 2013/0084963 A1 | 4/2013 | Shorrock et al. |
| 2013/0165199 A1 | 6/2013 | Lemay et al. |
| 2013/0165209 A1 | 6/2013 | Lemay et al. |
| 2013/0203489 A1 | 8/2013 | Lyons |
| 2013/0203490 A1 | 8/2013 | Hilbert |

FOREIGN PATENT DOCUMENTS

| | | |
|---|---|---|
| EP | 2608168 | 6/2013 |
| WO | WO-2007075380 | 7/2007 |

* cited by examiner

PROVIDING EXCLUSIVE GAMING FEATURES FOR MOBILE GAMING

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2013, WMS Gaming, Inc.

TECHNICAL FIELD

Embodiments of the inventive subject matter relate generally to wagering game systems and networks that, more particularly, incorporate wagering game content and mobile devices.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

Furthermore, personal, handheld mobile devices ("mobile devices"), such as smartphones, personal digital assistants (PDAs), tablet computers, and so forth, are becoming more popular and more prevalent than ever. Mobile devices continue to advance in technological capabilities. Software application sales for mobile devices are rising. Gaming enthusiasts, like many others, are using mobile devices more often in their personal lives. Therefore wagering game manufacturers, providers, casinos, and the like, are interested in ways to adapt use of mobile devices to the gaming industry.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into five sections. The first section provides an introduction to embodiments. The second section describes example operations performed by some embodiments while the third section describes additional example embodiments. The fourth section describes example operating environments while the fifth section presents some general comments.

Introduction

This section provides an introduction to some embodiments.

Some embodiments of the inventive subject matter include determining that a mobile device is activated, or enabled, for use during a wagering game session, and, in response, providing additional wagering game content to the mobile device. In some examples, the mobile device is activated, or enabled, for use when a communications link is established between the mobile device and a wagering game device. In some examples, the additional wagering game content can include features that otherwise would not be available for presentation during the wagering game session (e.g., the additional wagering game content includes features that are not available via primary wagering game content presented by a wagering game machine). In some embodiments, the features available via the additional content provided to the mobile device include separate progressive games, tournaments updates, separate wagering game content, increased payouts, etc. Some embodiments also include dividing, or apportioning, a theoretical payout percentage of a base game between the base game and secondary wagering game content presented via the mobile device. In yet other examples, features presented via the mobile device include tracking of events and information related to wagering game tournaments. These examples, and numerous others, are described in further detail in the description below.

Figure 1:
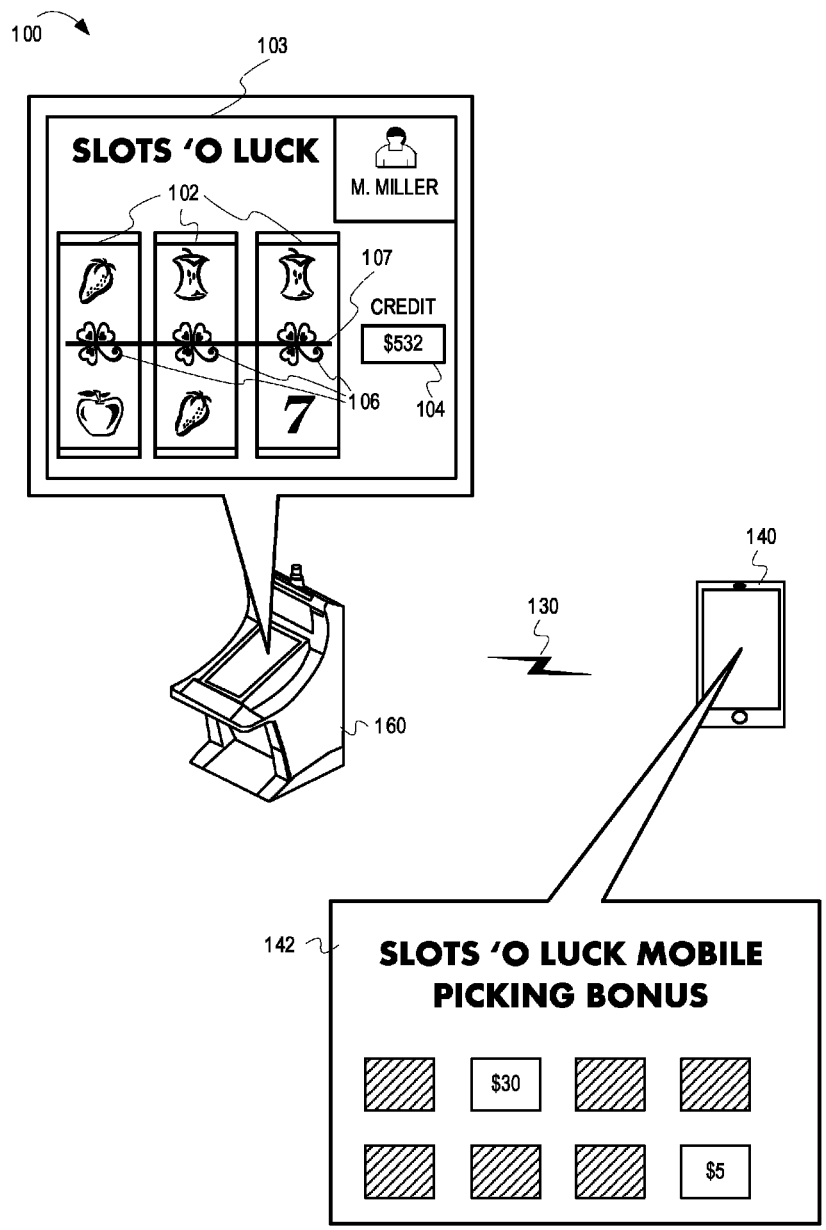
FIG. 1 is an illustration of providing exclusive gaming features based on use of a mobile device in a wagering game system, according to some embodiments.

FIG. 1 is a conceptual diagram that illustrates an example of providing exclusive gaming features based on use of a mobile device in a wagering game system, according to some embodiments. In FIG. 1, a wagering game system ("system") 100 includes a wagering game machine 160 and a mobile device 140. In some embodiments, the mobile device 140 is a smartphone, a tablet computer, a personal digital assistant, an MP3 player, or any other device capable of mobile transport and/or with elements capable of presenting visual and/or audible content. In some embodiments, the mobile device 140 is capable of interfacing with the wagering game machine 160 and/or other wagering game devices (e.g., electronic wagering game tables, casino displays, a wagering game server, etc.). For example, in some embodiments, the mobile device 140 is configured to communicate wirelessly with wagering game devices, such as via Bluetooth™, Wi-Fi, near-field communications, and/or other wireless technologies. In some embodiments, the system 100 includes wireless communication devices that receive and transmit wireless data, such as wireless transmitters, routers, etc.

The wagering game machine 160 is configured to present wagering game content. In some embodiments, the wagering game machine 160 is configured to present primary wagering game content and/or secondary wagering game content. For example, primary wagering game content includes a base game (e.g., a wagering game with a specific theme for which the wagering game machine 160 has been branded). In some examples, the secondary wagering game content may include bonus games that are associated with the base game. For example, a bonus game may be triggered by one or more events that occur within the base game. The bonus game can be configured to pay monetary and/or non-monetary awards. For instance, some bonus games pay out a degree of credits that are funded by wagers made in the base game. In some examples, the wagering game machine 160 is configured to present one or more secondary wagering games that are independent of the base game. For instance, the one or more secondary wagering games can be an independent application from an application for the base game. In some embodiments, the secondary wagering game can be configured to accept separate wagers from wagers made for the base game. The separate wagers for the secondary wagering game can fund payouts for the secondary wagering game separate from payouts made for the base game.

In some embodiments, the system 100 is configured to establish a communication link between the mobile device 140 and the wagering game machine 160. The system 100 is configured to provide incentives for establishing the connection. For instance, the wagering game machine 160 can present an invitation to connect the mobile device 140 with the wagering game machine 160. In some embodiments, the invitation can indicate an offer to provide additional content for presentation via the mobile device 140 if the mobile device 140 is linked to the wagering game machine 160 (e.g., a message presented via the wagering game machine 160 that indicates "bonus content available via your smartphone for triple shamrock symbols or triple horseshoe symbols on the reels"). The additional content can be content that is typically unavailable via the wagering game machine 160 and/or include additional features (e.g., wagering game features) that are not available for presentation via the wagering game machine 160. For example, when the mobile device 140 links with the wagering game machine 160, the wagering game machine 160 (or other gaming device within the wagering game venue) can initiate a mode that provides content 142 to the mobile device 140 in response to establishing a connection with the mobile device 140 (e.g., via a wireless link 130, such as a Bluetooth™ connection or a Wi-Fi connection). The content 142 includes a picking bonus game that is configured specifically for presentation via a mobile application. For example, the wagering game machine 160 presents a primary wagering game 103 (e.g., the fictional "Slots 'O Luck" wagering game). The primary wagering game 103 includes reels 102 and a credit meter 104 that indicates an amount of monetary value available for making wagers on spins of the reels 102. The wagering game machine 160 includes a wager control (e.g., a button on a button panel of the wagering game machine 160) that can simultaneously make a wager and initiate a spin of the reels 102. The reels 102 include symbols (e.g., shamrock symbols 106) that, after a spin (initiated by player input via the wagering game machine 160), stop in an arrangement, or configuration, called a reel-stop configuration. The reel-stop configuration is based on a random number generated by the wagering game machine 160 or by another gaming device linked with the wagering game machine 160 (e.g., a wagering game server). The primary wagering game 103 includes a pay table that indicates that specific reel-stop configurations with certain arrangements of symbols in a payline 107 will result in a win (i.e., will pay a specific monetary award). For example, when the three shamrock symbols 106 align according to the payline 107, the primary wagering game 103 shows a win celebration and pays a specific amount of credits. Further, in response to the specific reel-stop configuration of the three shamrock symbols 106, the wagering game machine 160 detects that a communications link has been established with the mobile device 140. Because the three shamrock symbols 106 align along the payline 107 and because the mobile device 140 is linked with the wagering game machine 160, the wagering game machine 160 provides the content 142 to be presented via the mobile device 140. In some embodiments, if the mobile device 140 were not connected to the wagering game machine 160, the wagering game machine 160 would not have provided the content 142 to the mobile device 140. In other embodiments, if the mobile device 140 was not connected to the wagering game machine 160, the wagering game machine 160 may have still presented the content 142 but with fewer features, lesser payouts, lower quality, or some diminution of the content 142.

Further, some embodiments of the inventive subject matter describe examples of providing exclusive wagering game content for a mobile device in a network wagering venue (e.g., an online casino, a wagering game website, a wagering network, etc.) using a communication network. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, for purposes of the present detailed description, a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Furthermore, for purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Although FIG. 1 describes some embodiments, the following sections describe many other features and embodiments.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 2:
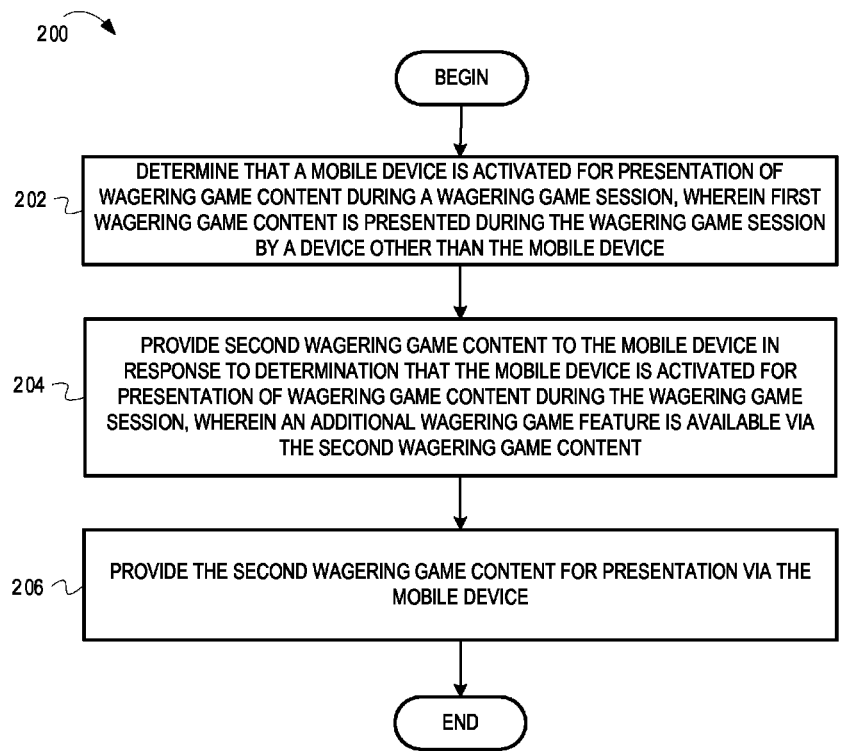
FIG. 2 is a flow diagram 200 illustrating providing exclusive gaming features based on use of a mobile device in a wagering game system, according to some embodiments.
Figure 3:
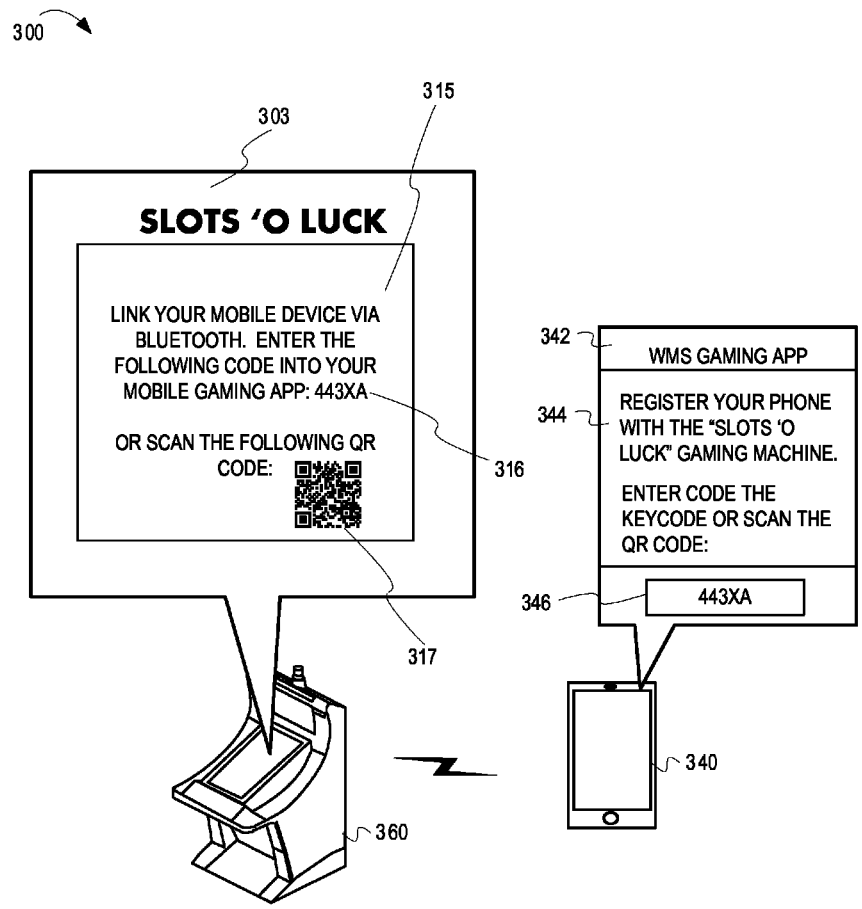
FIG. 3 is an illustration of establishing a communications link between a wagering game device and a mobile device, according to some embodiments.
Figure 4:
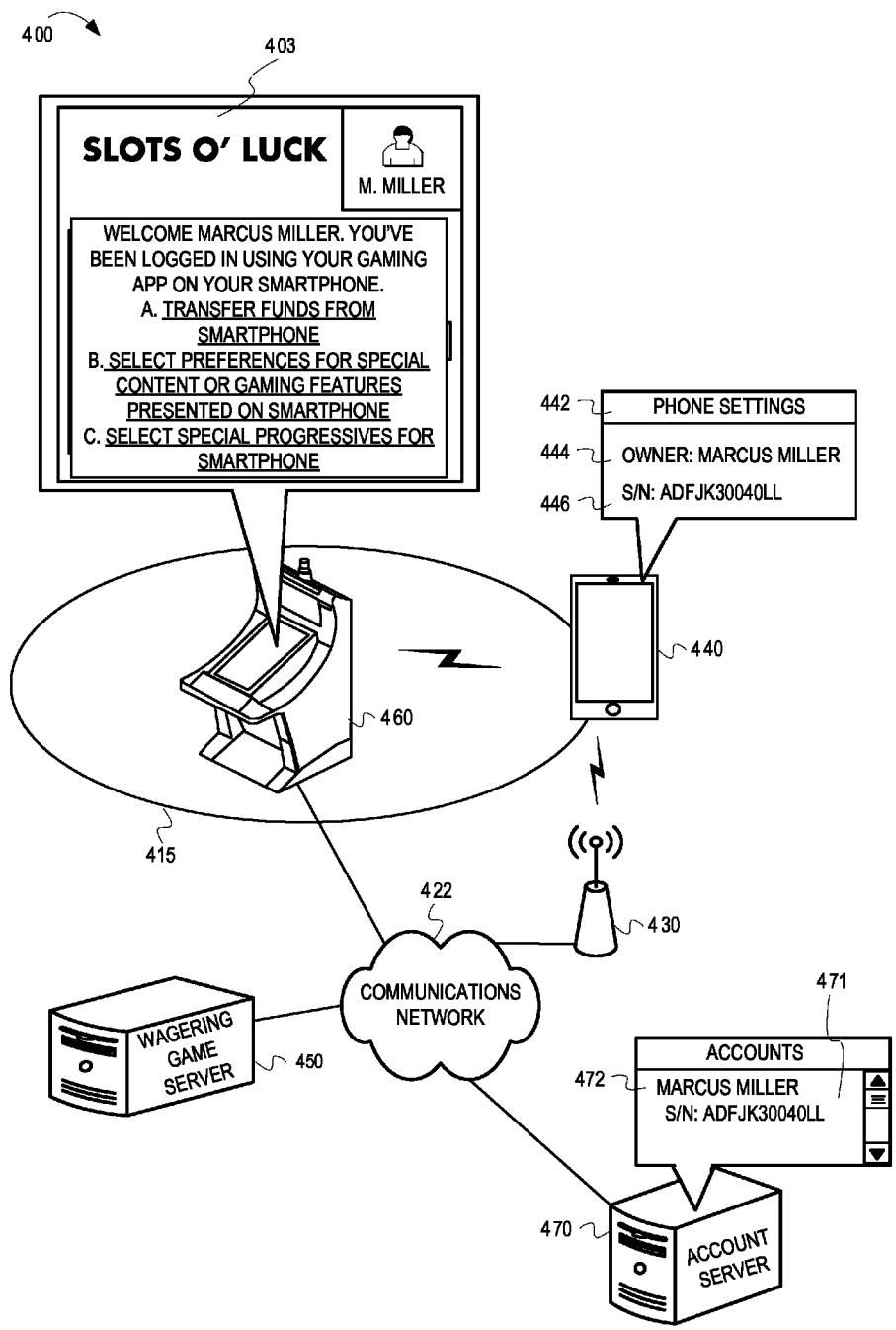
FIG. 4 is an illustration of providing exclusive gaming content to a linked mobile device, according to some embodiments.
Figure 5:
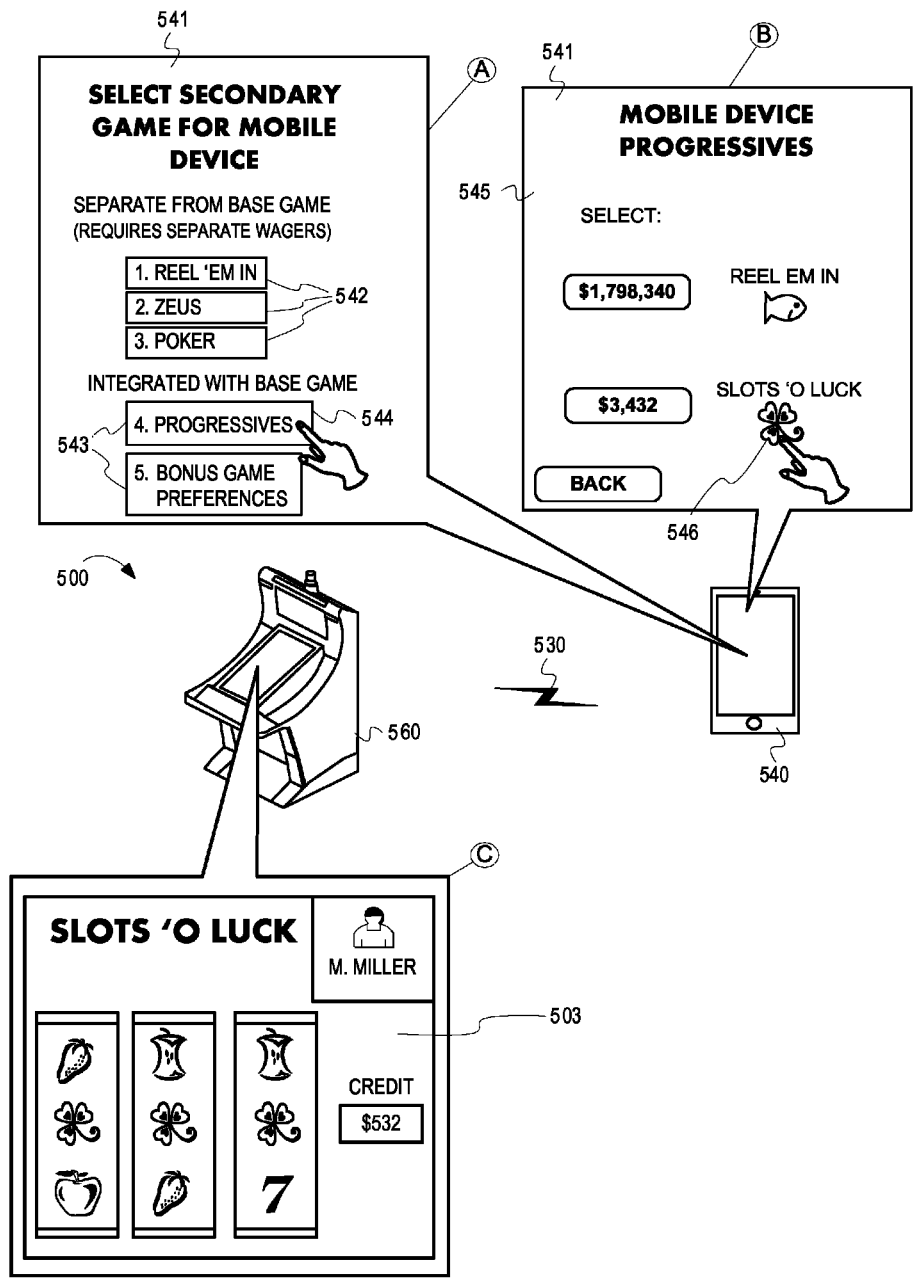
FIG. 5 is an illustration of providing exclusive gaming content to a linked mobile device, according to some embodiments.

FIG. 2 is a flow diagram ("flow") 200 illustrating providing exclusive gaming features based on use of a mobile device in a wagering game system, according to some embodiments. FIGS. 3, 4, and 5 are conceptual diagrams that help illustrate the flow of FIG. 2, according to some embodiments. This description will present FIG. 2 in concert with FIGS. 3, 4 and 5. In FIG. 2, the flow 200 begins at processing block 202, where a wagering game system ("system") determines that a mobile device is activated for presentation of wagering game content during a wagering game session, wherein first wagering game content is presented during the wagering game session by a device other than the mobile device. In some embodiments, the system determines that the mobile device is activated for presentation of wagering game content by determining that the mobile device is proximate to a wagering game device. The system can determine that the mobile device is proximate to a wagering game device using global positioning techniques (GPS), indoor positioning techniques (e.g., indoor positioning systems, or IPS), mobile network tracking, or other techniques for tracking a position of a mobile device relative to a position of a wagering game device. In some embodiments, the system determines that the mobile device is activated for presentation of wagering game content by determining that a communication link is established between a mobile device and a wagering game device. In some embodiments, the wagering game device is one or more of a wagering game machine, a wagering game server, a web server, a central game controller, etc. In some embodiments, the wagering game device is configured to control (e.g., calculate, process, etc.) or present the first wagering game content. In some embodiments, the wagering game device is configured to communicate wirelessly with the mobile device via one or more of Bluetooth, Wi-Fi, near-field communication, etc. In some embodiments, the mobile device connects with the wagering game device via wireless communication techniques, hardware, etc. such as via wireless signal receivers, routers, etc. For examples, in some embodiments, a gaming venue (e.g., a casino) provides a private Wi-Fi network to which the mobile device can connect, or join. In some embodiments, a wagering game device can provide a code (e.g., an alpha-numeric code, a QR code, a barcode, etc.). In some embodiments, the system can provide an RSA code on the mobile device, such as when the mobile device logs into a virtual private network (VPN). The RSA code can be entered into an interface of a wagering game machine. In some embodiments, the mobile device connects directly with the wagering game device, such as via a wired connection. In some embodiments, the mobile device connects when in a specific location of a gaming venue, when a portion of the mobile device is touched (e.g., via button press, screen touch, voice activation, etc.), when the mobile device is within a specific proximity to a gaming device, when the mobile device is touching or close to a particular part of a wagering game machine, when the mobile device is moved with a particular gesture, when the mobile device is oriented in a specific way relative to a sensor or recording device (e.g., a camera), when the mobile device detects a biometric measurement related to a player, when the mobile device receives a security key or performs a security key pairing procedure, when the mobile device receives a radio-frequency identifier, etc. In some embodiments, both the wagering game device and the mobile device must detect an action pairing (e.g., a biometric authentication procedure is performed at the mobile device and a login procedure occurs via a wagering game machine).

In some embodiments, the system further determines that the mobile device is activated for presentation of wagering game content by determining that an application is active (e.g., installed, enabled, launched, open, etc.) on the mobile device. The application is configured to present the secondary wagering game content.

In some embodiments, the system automatically establishes the link with the mobile device based on proximity to the wagering game device. For example, the system detects that the mobile device is within a proximity range to the wagering game device or a portion of the wagering game device (e.g., the mobile device is placed into a docking station or placed on a near-field communication pad of a wagering game machine). In some embodiments, the system requests verification by the mobile device to present the second content via the mobile device in response to detecting that the mobile device is within the proximity range. In some embodiments, the system receives the verification from the mobile device after requesting the verification and provides the second wagering game content in response to receiving the verification.

In some embodiments, the system detects that the mobile device is associated with a player account when the link is established with the mobile device. The system can automatically login the player account to a wagering game device (e.g., to a wagering game machine).

FIGS. 3 and 4 illustrate some examples of connecting a wagering game device and a mobile device as described at processing block 202. FIGS. 3 and 4 will be described in the following few paragraphs and then the discussion will return to the description of flow 200. In FIG. 3, a wagering game system ("system") 300 includes a wagering game device, such as a wagering game machine 360 and a mobile device 340. The mobile device 340 is configured to connect with the wagering game machine 360 via a communications link. The wagering game machine 360 generates a message 315 via a display. The message 315 includes instructions to open a gaming application 342 of the mobile device 340, or view an interface 344 of an already opened instance of the gaming application 342. The interface 344 can include a message to manually enter a code 316 specified in the message 315 into a field 346 of the gaming application 342 or to scan a QR code 317 using the mobile device 340. The code 316 and/or QR code 317 can enable a secure connection between the mobile device 340 and the wagering game machine 360.

FIG. 4 illustrates another example of connecting a wagering game device with a mobile device according to some embodiments. In FIG. 4, a wagering game system ("system") 400 includes a wagering game machine 460, a mobile device 440, a wagering game server 450 and an account server 470 connected via a communications network 422. The wagering game machine 460 is configured to present wagering game content 403. In some embodiments, the system 400 detects when the mobile device 440 is within a proximity range 415 to the wagering game machine 460, such as during a wagering game session for which the wagering game content 403 is presented. A gaming device, such as the wagering game machine 460 or the wagering game server 450, establishes a communication link with the mobile device 440 (e.g., the mobile device 440 connects wirelessly via a wireless transceiver 430 to the wagering game server 450). The gaming device detects settings 442 of the mobile device 440. The settings 442 include information 444 about an owner of the mobile device 440 and an identifier 446 for the mobile device 440, such as a serial number. In other examples, the system 400 determines other information about mobile device 440, such as a type of device, capabilities of the mobile device, applications running on the mobile device, etc. The system can select secondary gaming content based on the information about the mobile device.

The system 400 (e.g., the wagering game server 450), compares the information from the settings 442 to information about a player account logged in to the wagering game machine 460 (e.g., a player account 471 for the "Marcus Miller" player logged in to the wagering game machine 460). The player account 471 specifies information 472 about the player (e.g., the player's name and a copy of the identifier 446). The system 400 verifies that the identifier 446 of the mobile device 440 matches in the settings 442 and the player account 471 and authorizes communications with the mobile device 440. In some embodiments, after establishing the communications link with the mobile device 440 and, in response to authorizing communications with the mobile device 440, the system 400 authorizes communications between the mobile device 440 and the wagering game server 450 to provide content with one or more features not available via primary wagering game content of the wagering game machine 460.

Referring back to FIG. 2, the flow 200 continues at processing block 204, where the system selects second wagering game content in response to determination that the mobile device is activated for presentation of wagering game content during the wagering game session, wherein an additional wagering game feature available via the second wagering game content. The additional wagering game feature may be referred to as an exclusive wagering game feature because it becomes available only after the mobile device is activated, or enabled, for use during the wagering game session. For example, when the system detects that the mobile device links with a wagering game device, the system can select and/or provide the second wagering game content. In some embodiments, the system may further require an event to occur within the first wagering game content (e.g., a winning event) prior to selecting and/or providing the second wagering game content. In some embodiments, the second wagering game content includes a wagering game feature that the first wagering game content does not include. For instance, the system may provide a bonus wagering game that is exclusively available for presentation via the mobile device. FIG. 1 illustrated an example of a picking bonus game. However, a picking game is only one of numerous types of bonus wagering games that could be associated with the first wagering game content. Other examples include, but are not limited to, reel-based bonus games, persistent bonus games, episodic bonus games, skill-based bonus games, mystery bonus games, etc. In some embodiments, the wagering game feature is additional functionality that is added to the second wagering game content, but only is only available for presentation via the second wagering game content. For instance, the second wagering game content may include enhanced functions, greater payouts, higher display quality, or some other enhancement above, or beyond, what is available via the first wagering game content.

In some embodiments, the second wagering game content includes monetary and non-monetary prizes that are not available via the first wagering game content or that are better or different from those available via the first wagering game content.

In some embodiments, the system provides services or options for the second wagering game content that are not available via the first wagering game content. For example, the second wagering game content may be accessible by social contacts (e.g., other player accounts, social network user accounts linked to the player account, etc.), whereas the first wagering game content may not be accessible by the social contacts.

In some embodiments, the second wagering game content is related to a group event or community wagering game such as a scavenger hunt game, a progressive game, a wagering game tournament, etc.

In some embodiments, the system can detect specific details (e.g., player preferences, history of play, social contacts, etc.) of the player account logged in to a wagering game device. In some examples, based on the specific details, the system selects the second wagering game content and/or customizes the second wagering game content. For example, the system may select from two types of exclusive bonus games to present. To select which of the exclusive bonus games to present, the system may refer to player preferences regarding game type, game theme, game rewards, game odds, game volatility, etc.

In some embodiments, the second wagering game content includes an integrated presentation with primary wagering game content, such as a coordinated presentation of thematic content or tying together of secondary and primary content. In some embodiments, the coordinated presentation includes a coordinated timing of presentation and/or a coordinated functionality (e.g., the additional wagering game feature on the mobile device can coordinate with wagering game features of the base game). In some embodiments, the primary content presents a feature that would not normally be available unless the mobile device was connected.

In some embodiments, the second wagering game content includes a progressive game (e.g., a progressive that is only available only to those who have linked their mobile device). FIG. 5 illustrate an example of providing progressive games for a mobile device. In FIG. 5, a wagering game system ("system") 500 includes a wagering game machine 560 and a mobile device 540. A communications link is established with the mobile device 540 (e.g., between the mobile device 540 and the wagering game machine 560 and/or other gaming devices). At stage "A," the system 500 presents, via the mobile device 540, an interface 541 from which a player can select various types of content to present via the mobile device 540. For example, first options 542 relates to content for wagering games that are separate from, and independent of, a content presented via the wagering game machine 560. The first options 542 may present a wagering game via the mobile device 540 that requires separate wagers and which includes separate themes, denominations, or other gaming features. Second options 543 may include content that is integrated with content presented via the wagering game machine 560. For example, one of the second options 543 (e.g., a user-interface control 544) refers to progressive games. If the control 544 is selected, then, at stage "B," the mobile device 540 presents information 545 regarding a plurality of progressive games. Each of the progressive games can have different pot values. The progressive pots can be funded by different base games provided by wagering game devices that can link with mobile devices. The information 545 for the progressive games can present continuous pot values that show a current numerical value for progressives at any given time without requiring user input to refresh. In some embodiments, when one of the progressives is selected, the system 400 can present an appropriate base game via the wagering game machine 560 matched to the progressive type. For example, if an item is selected or activated via the mobile device 540 (e.g., the "Slots 'O Luck" graphical control 544 is touched), then, at stage "C," the system 500 can cause the base game on the wagering game machine 560 to load new primary wagering game content 503 with a matching theme or change the appearance, functions, etc., of the primary wagering game content 503.

The flow 200 continues at processing block 206, where the system provides the second wagering game content for presentation via the mobile device. After selecting the second wagering game content, the system can provide the second wagering game content for presentation via the mobile device. For example, the system can transmit the second wagering game content via a communication link between the mobile device and a wagering game device configured to provide the second wagering game content. In some embodiments, the system selects the second wagering game content from a content store accessible by the mobile device (e.g., selects the second wagering game content from a network drive or Internet location and wirelessly transmits the content to the mobile device, selects the second wagering game content from a storage unit of a wagering game machine and transmits it to the mobile device, selects the secondary wagering game content from a data store or memory of the mobile device, etc.).

In some embodiments, the mobile device presents the content via a specific application of the mobile device and/or via a browser application. For example, the second wagering game content can be configured in a format, such as HTML 5 or other browser-based format, that is presentable in any one or a number of web browser applications configured for the mobile device. In some embodiments, the system can deliver the content via a private Wi-Fi network, or via the Internet, to the mobile device to present via the browser. In other embodiments, when the mobile device presents the content via a particular application that is specially designed for the second wagering game content (e.g., not a web browser), the second wagering game content may be specifically formatted for that particular application. When the mobile device is linked to a gaming device during a wagering game session, the primary wagering game content presented during a wagering game session does not have to have a same format as the second wagering game content. For example, the primary wagering game content could be presented via a mechanical slot machine that does not utilize computer graphics or animated game content. However, the second wagering game content can be computerized.

In some embodiments, the system detects a wagering game activity performed via the secondary gaming content by the mobile device, and, in response to detecting the wagering game activity, the system modifies parameters of the first wagering game content.

In some embodiments, the system detects an accomplishment via the primary wagering game content for a persistent, or long-term, wagering game or competition, (e.g., for a persistent game that a player has registered for, for a wagering game tournament that a player has entered, etc.); and provides a message, in the secondary wagering game content, regarding the accomplishment for presentation via the mobile device.

In some embodiments, the system provides third content for presentation via the mobile device after the communication link terminates based on the communication link having been established between the mobile device and the wagering game device. For example, the third content can include wagering game content that a player can access via the mobile device while within a gaming venue or while the mobile device is within a jurisdictional that allows wagering games. In some embodiments, the third content includes non-wagering game content, such as "for-fun" versions of wagering games, invitations to events, promotional content, marketing content, access to websites and other Internet services, etc.

Furthermore, FIG. 2 indicated an example where second wagering game content provided to the mobile device includes the additional or exclusive wagering game feature. In other embodiments, however, in response to linking of the mobile device and/or in response to presentation of second wagering game content via the mobile device, the system can activate, or unlock, one or more features within the first wagering game content that would otherwise not have been available, such as more functionality, greater payouts, higher display quality, or some other enhancement above, or beyond, what is normally available by default via the first wagering game content.

Figure 6:
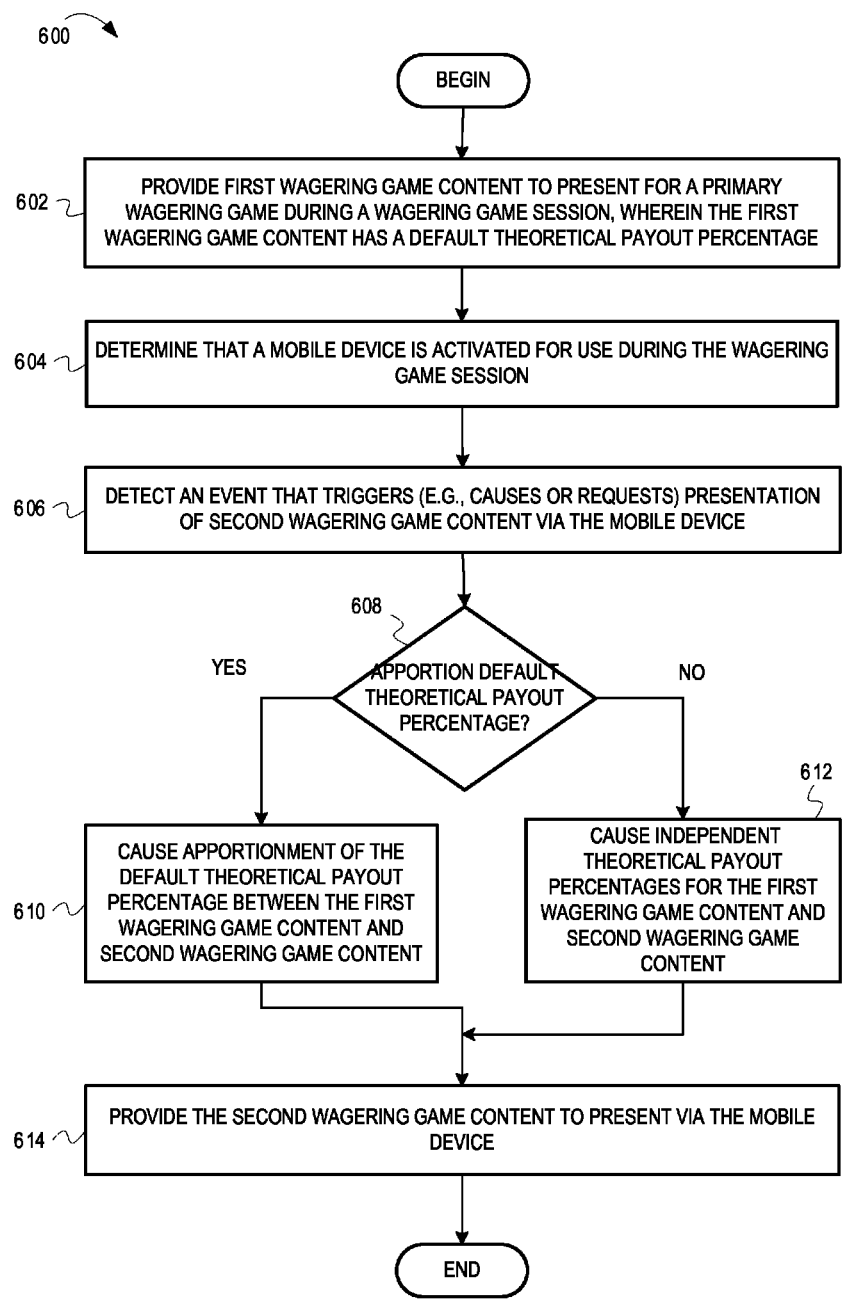
FIG. 6 is a flow diagram 600 illustrating controlling theoretical payout percentages of gaming content provided to a mobile device, according to some embodiments.
Figure 7:
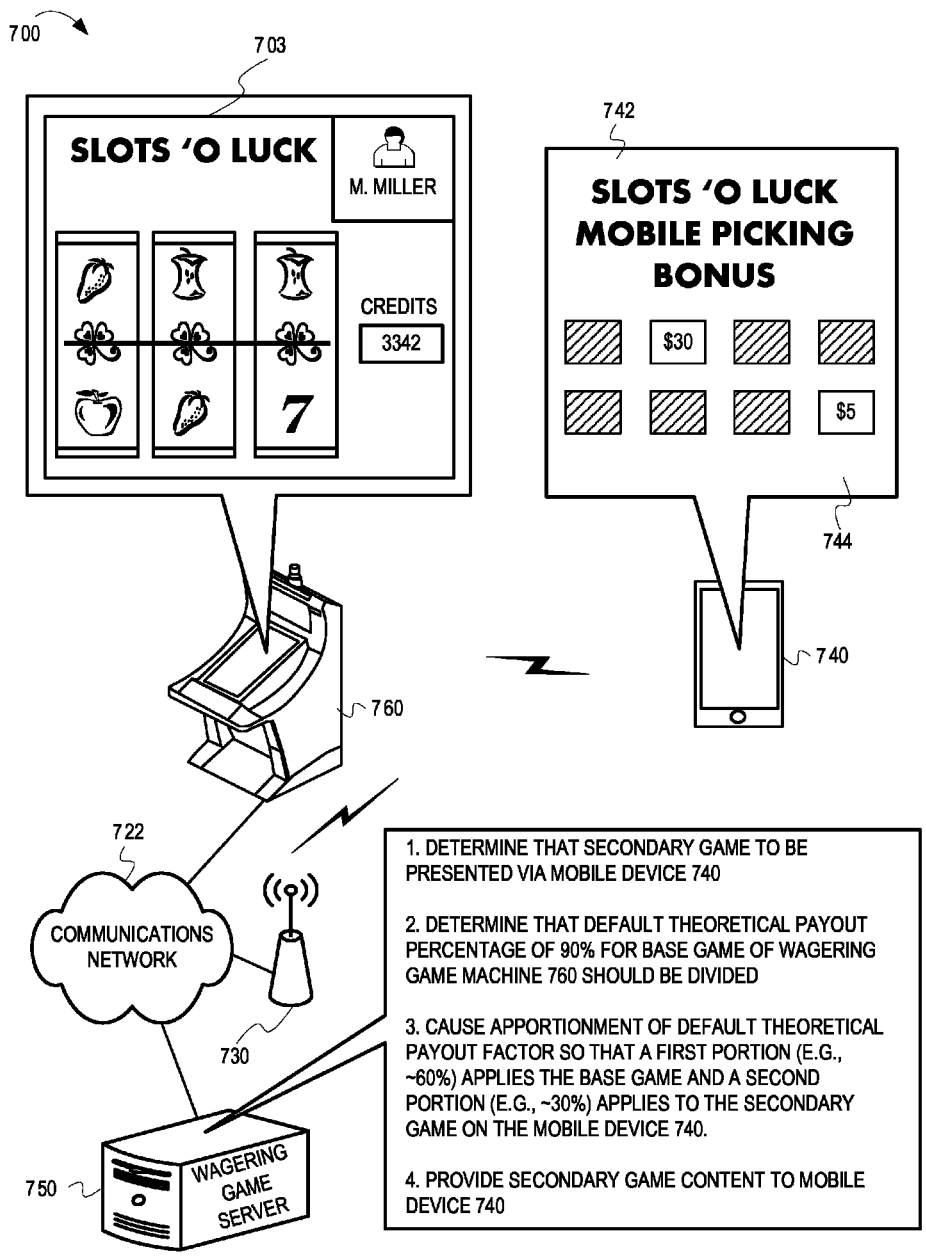
FIG. 7 is an illustration of controlling theoretical payout percentages of gaming content provided to a mobile device, according to some embodiments.

FIG. 6 is a flow diagram ("flow") 600 illustrating controlling theoretical payout percentages of exclusive gaming content provided to a mobile device, according to some embodiments. FIG. 7 is a conceptual diagram that helps illustrate the flow of FIG. 6, according to some embodiments. This description will present FIG. 6 in concert with FIG. 7. In FIG. 6, the flow 600 begins at processing block 602, where a wagering game system ("system") provides first wagering game content to present for a primary wagering game during a wagering game session, wherein the first wagering game content has a default theoretical payout percentage. For example, as similarly described for FIGS. 1-5, a wagering game device, such as a wagering game machine, can present primary wagering game content, such as a base game. In some embodiments, the primary wagering game content, configured for presentation during the wagering game session, has a default theoretical payout percentage. The default theoretical payout percentage is a percentage of an amount of money, or monetary equivalent, that the primary wagering game should be expected to payout from wagers made for the primary wagering game. For example, some jurisdictional rules related to gambling require a minimum percentage of wagers made by players to pay back to players over a specific period of time or over a specific number of events (e.g., over a lifetime of a wagering game machine on which the primary wagering game is presented, over a specific number of wagering game sessions, over a specific number of game plays, etc.). For instance, some jurisdictional rules require that a wagering game payout (over the time period, event count, etc.) be a minimum amount (e.g., eighty four percent (84%)) of wagers made via wagering game play of the primary wagering game and/or via secondary wagering games associated with the primary wagering game. A value of money, or monetary equivalents that are expected to be paid out, may be referred to as expected value of the wagering game and/or of the wagering game device that presents the wagering game. The default theoretical payout percentage can be associated with expected values to be potentially paid for direct wins of the primary wagering game (that receive wagers for each play) and for bonus games associated with the primary wagering game, which bonus games that are presented without requiring additional wagers.

The flow 600 continues at processing block 604, where the system determines that a mobile device is activated for use during the wagering game session. In some embodiments, the system determines that the mobile device is proximate to a wagering game machine, as similarly described previously. In some embodiments, the system detects that a communication link is established with the mobile device associated with the wagering game session as described previously.

The flow 600 continues at processing block 606, where the system detects an event that triggers (e.g., causes or requests) presentation of second wagering game content via the mobile device. Some triggers cause the second wagering game content to be presented based on events that occur within the primary wagering game. For instance, a trigger event (e.g., a specific reel-stop configuration) in a primary wagering game can cause a bonus game to occur. As explained previously, because the mobile device is enabled for use during the wagering game session, the triggering event can cause presentation of content that normally would not be available during the wagering game session and/or include features that are not available from, or that are different from, features of content presentable via the primary wagering game.

Other triggers can cause the second wagering game content to be presented based on events that occur by the mobile device. For example, after the mobile device is enabled for use during a wagering game, the mobile device can request second gaming content from a linked wagering game device. In some embodiments, launching an application on the mobile device can request second wagering game content. In some embodiments, user input received via the mobile device can request second wagering game content. In some embodiments, an event that occurs in content presented via the mobile device during a wagering game session (e.g., an accomplishment that occurs in a non-wagering, or "for fun", game played on the mobile device), can cause presentation of the second wagering game content via the mobile device.

In some embodiments, a trigger can cause the presentation of the second wagering game content via the mobile device only, via a wagering game device only, or via both the mobile device and via the wagering game device.

The flow 600 continues at processing block 608, where the system determines whether to apportion the default theoretical payout percentage. In other words, the system determines (a) whether the second wagering game content should have a theoretical payout percentage that is a portion of the default theoretical payout percentage of the first wagering game content (i.e., have a "divided" theoretical payout percentage), or (b) whether the second wagering game content should have a theoretical payout percentage independent from that of the default theoretical payout percentage for the first wagering game content. One reason for dividing or apportioning the default theoretical payout percentage of the first wagering game content may be that the second wagering game content may provide monetary winnings without receiving additional wagers to fund those monetary winnings. For instance, if the second wagering game content is a bonus game of the first wagering game content, then the bonus game can make payouts that are based on the wagers made via the first wagering game content without requiring additional wagers for the bonus game. In such a situation, it can be useful to reduce the default theoretical payout percentage for the first wagering game content, and spread it out amongst the first wagering game content and the second wagering game content. In some instances, this "dividing" can reduce the chances that either the first or second wagering game content would pay out too much monetary benefit when they are presented concurrently. Paying out too much monetary benefit can affect the expected payout value for a wagering game machine in a way that is detrimental to the casino or wagering game provider. Therefore, in such a situation, the system can divide the default theoretical payout percentage of the first wagering game content amongst the first wagering game content and the second wagering game content in such a way that the first wagering game content and the second wagering game content each have a theoretical payout percentage that is less than the default theoretical payout percentage. The flow 600, thus, continues at processing block 610.

Referring to processing block 610, the system causes apportionment of the default theoretical payout percentage between the first wagering game content and the second wagering game content. For instance, the system can modify the first wagering game content to reduce the first theoretical payout percentage for the first wagering game content to a second theoretical payout percentage, and provide the second wagering game content for presentation via the mobile device. The second wagering game content has a third theoretical payout percentage less than the first theoretical payout percentage. In some embodiments, the system modifies the first wagering game content so that the second theoretical payout percentage is a first portion of the first theoretical payout percentage. The first portion of the first theoretical payout percentage is less than the first theoretical payout percentage. The system can further provide the second wagering game content so that the third theoretical payout percentage is a second portion of the first theoretical payout percentage, which second portion of the first theoretical payout percentage is less than the first theoretical payout percentage.

In some embodiments, system modifies the first wagering game content by replacing a stored value for the first theoretical payout percentage with a value of the second theoretical payout percentage. For instance, the system can assign portions of the default theoretical payout percentage between the first wagering game content and second wagering game content. For instance, the system may assign a first portion of the first theoretical payout percentage to the first wagering game content, thus reducing, or replacing, the default theoretical payout percentage with a second theoretical payout percentage less than the default theoretical payout percentage. The system may then assign a second portion of the default theoretical payout percentage to second wagering game content so that the second wagering game content has a third theoretical payout percentage that is less than the default theoretical payout percentage. In some embodiments, the combined total of the second theoretical payout percentage and the third theoretical payout percentage is less than or substantially equivalent to the default theoretical payout percentage.

In some embodiments, the system modifies the first wagering game content by modifying a parameter related to an expected value for the first wagering game content (e.g., modifies a programming statement, formula, function, subroutine, variable, etc. related to expected value for the first wagering game content). The modification to the parameter can cause the reduction to the default theoretical payout percentage. In some embodiments, the system modifies the first wagering game content by replacing some or all of the first wagering game content with replacement code, software, modules, etc., that recalculate mathematical factors of the first wagering game content. For instance, in some embodiments, the system replaces a first math table of the first wagering game content with a second math table that will likely result in lower payouts of the first wagering game content while the second wagering game content is presented via the mobile device. The replacement of the some, or all, of the first wagering game content can cause the reduction to the default theoretical payout percentage. In some embodiments, the system modifies the first wagering game content by decreasing a probability of occurrence of at least one winning wagering game event of the first wagering game content (e.g., the system modifies a number of symbols that can be presented via slot reels). The decreasing of the probability of occurrence of the at least one winning wagering game event can cause the reduction to the default theoretical payout percentage. In some embodiments, the system modifies the first wagering game content by decreasing a potential win amount of at least one winning wagering game event of the first wagering game content (e.g., decreasing a potential net winning for an event, such as lowering a payout amount for a specific reel-stop configuration or requiring a higher wager). The decreasing of the potential win amount can cause the reduction to the default theoretical payout percentage.

FIG. 7 illustrates an example of dividing a theoretical payout percentage for a primary wagering game in response to detecting that a mobile device is enabled for use in a wagering game session. In FIG. 7, a wagering game system ("system") 700 includes a wagering game machine 760, a mobile device 740, and a wagering game server 750 connected via a communications network 722. Wireless communications devices, such as a wireless transceiver 730 can communicate wireless data via the communications network 722.

The wagering game machine 760 presents primary wagering game content 703. The primary wagering game content 703 has a specific math variant, such as a default theoretical payout percentage of 90%. The primary wagering game content 703 experiences a triggering event, such linking of the mobile device 740 and/or as a specific reel-stop configuration, which triggering event indicates that secondary wagering game content 742 should be presented via the mobile device 740. The primary wagering game content 703 may be controlled by one or more of the wagering game machine 760 and/or the wagering game server 750. The secondary wagering game content 742 may be a kind of bonus game that integrates with (e.g., uses math tables from, shares financial accounting with, etc.) the primary wagering game content 703. When the system 700 determines to provide the secondary wagering game content 742 to the mobile device 740, the system 700 divides the default theoretical payout percentage of 90% so that the base game for the primary wagering game content 703 gets approximately a 60% math variant (e.g., a 60% theoretical payout percentage) and the bonus game for the secondary wagering game content 742 gets approximately a 30% math variant (e.g., a 30% theoretical payout percentage). This causes the payout for the base game to be reduced by allocating a percentage of the payout factor to the bonus game.

Referring back to processing block 608, if the system determines that the default theoretical payout percentage for the first wagering game content should not be divided, then the flow 600 continues at processing block 612.

Regarding processing block 612, the system utilizes independent theoretical payout percentages for the first wagering game content and second wagering game content. For example, the first wagering game content can be funded by first wagers made via the wagering game device and the second wagering game content can be funded by second wagers made via the mobile device.

The flow 600 continues at processing block 614, where the system provides the second wagering game content to present via the mobile device. The system can provide the second wagering game content to the mobile device as previously described.

Figure 8:
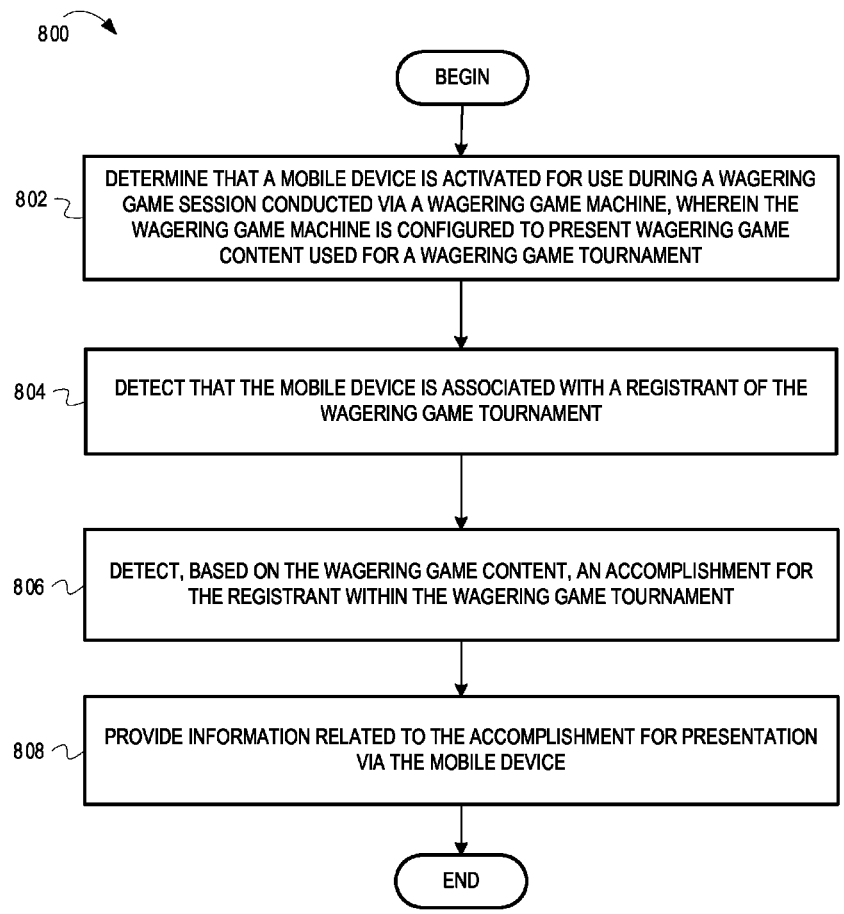
FIG. 8 is a flow diagram 800 illustrating providing content to a mobile device for a wagering game tournament, according to some embodiments.
Figure 9:
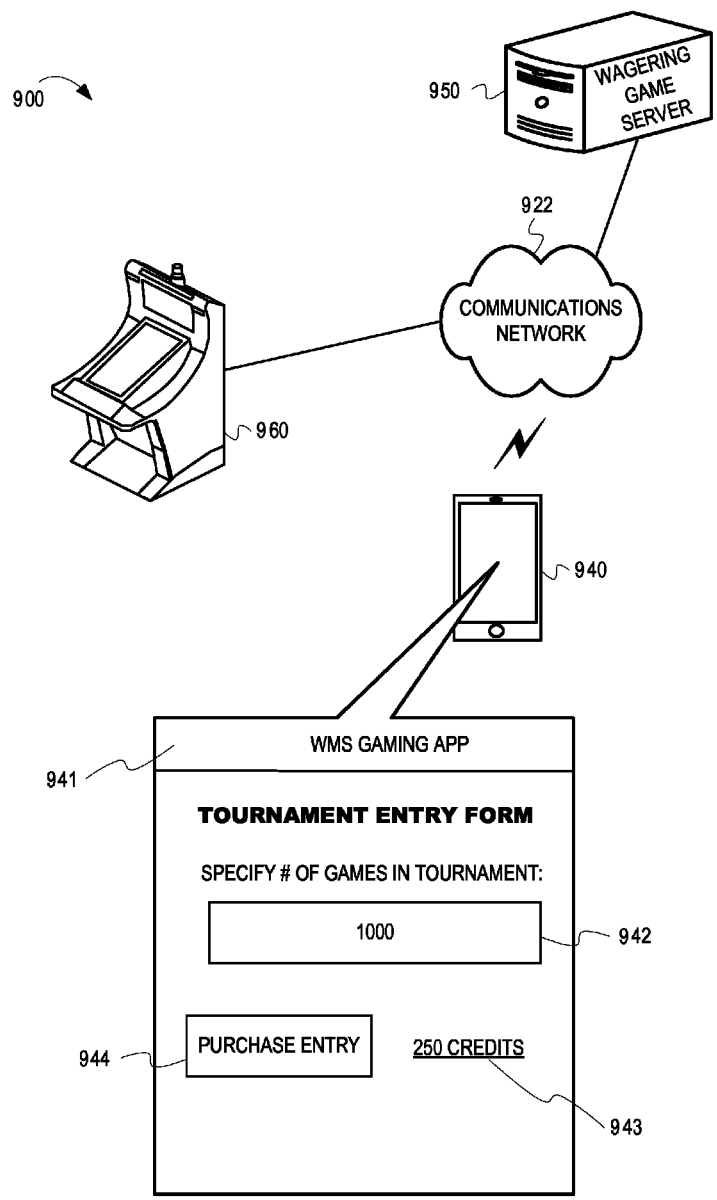
FIG. 9 is an illustration of providing content to a mobile device for a wagering game tournament, according to some embodiments.
Figure 10:
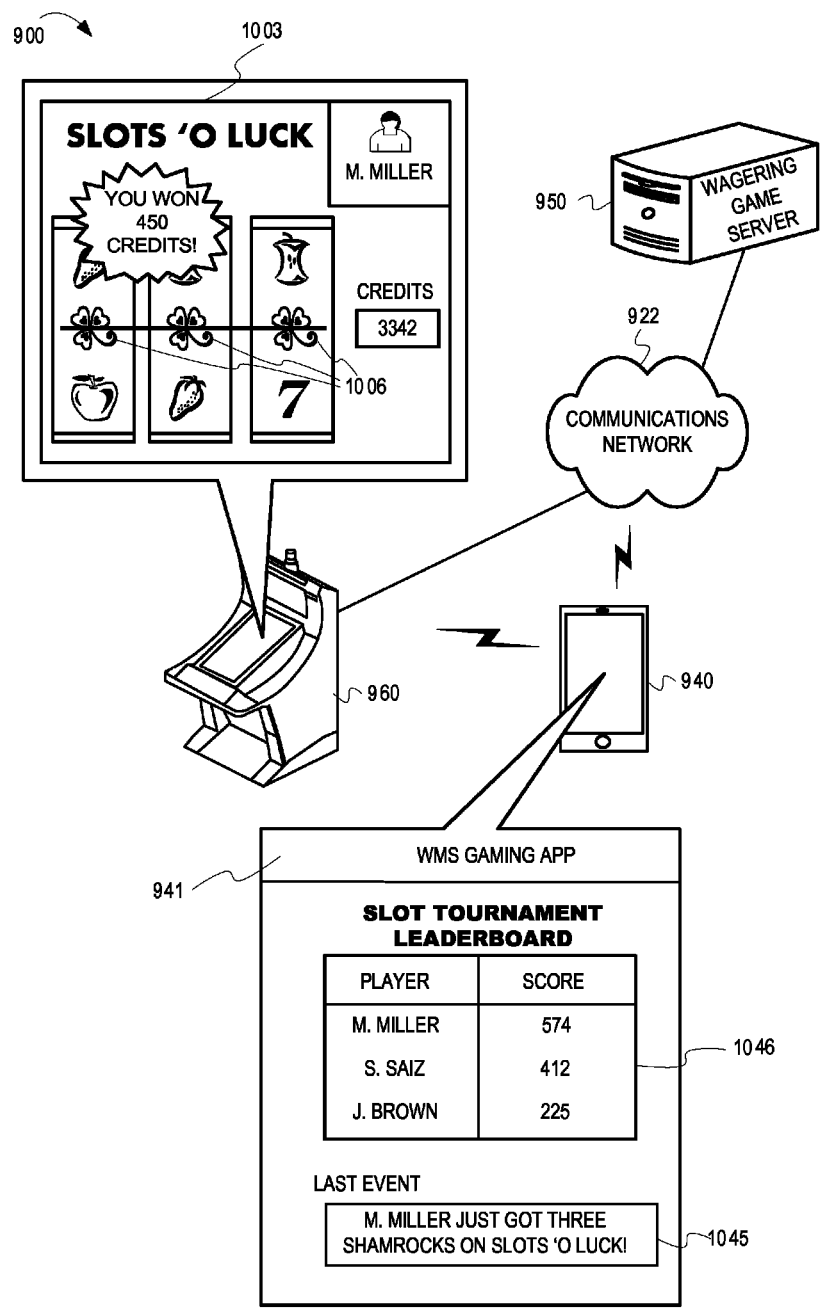
FIG. 10 is an illustration of providing content to a mobile device for a wagering game tournament, according to some embodiments.

FIG. 8 is a flow diagram ("flow") 800 illustrating providing exclusive content to a mobile device for a wagering game tournament, according to some embodiments. FIGS. 9 and 10 are conceptual diagrams that help illustrate the flow of FIG. 8, according to some embodiments. This description will present FIG. 8 in concert with FIGS. 9 and 10. In FIG. 8, the flow 800 begins at processing block 802, where a wagering game system ("system") determines that a mobile device is activated for use during a wagering game session conducted via a wagering game machine, wherein the wagering game machine is configured to present wagering game content used for a wagering game tournament. The system can determine that the mobile device is activated for using during the wagering game session as described previously. For example, the system can detect that the mobile device is proximate to a wagering game machine. In another example, the system can determine that a communication link is established between a mobile device and a wagering game controller, wherein the wagering game controller provides wagering game content for a wagering game tournament. In some embodiments, the system determines that the communication link is established similar to other examples described previously where a mobile device becomes enabled, or activated, for use during a wagering game session (e.g., establishes a communication link with a wagering game device). A wagering game tournament may include a competition by one or more wagering game players to obtain specified accomplishments within a given time period and/or within a specific number of gaming events (e.g., to obtain a specific number of winnings within a given number of games played, to obtain more winnings than other players registered for the tournament, etc.).

The flow 800 continues at processing block 804, where the system detects that the mobile device is associated with a registrant of the wagering game tournament. In some embodiments, the system detects a request to register for the wagering game tournament via the mobile device. For instance in FIG. 9, a wagering game system ("system") 900 includes a wagering game machine 960, a wagering game server 960, and a mobile device 940 connected via a communications network 922. The mobile device 940 can launch an application 941 that indicates options for participating in a wagering game tournament. As indicated previously, the mobile device 940 can automatically log in a wagering game player account when the application 941 is launched. In other embodiments, the application 941 is configured to receive user authentication input (e.g., user name and/or passcode). Via a user interface of the mobile device 940, a user can specify, within the application 941, a number of games to track for the wagering game tournament (e.g., via field 942). The tournament will then last until the number of games are played (e.g., until a number of spins are made, until a number of card hands are played, etc.). Based on the number of games, the application 941 indicates an entry, or registration, fee 943 for the wagering game tournament. The application 941 also includes a purchase control 944 that, when selected, initiates the payment of the registration fee 943 and enters the player account in the wagering game tournament. The mobile device 940 can communicate with the wagering game server 950 to transact the payment of the registration fee 943 using funds from an account balance of the player account.

At some point, either after, or concurrently, with the registration of the player account for the wagering game tournament, the mobile device 940 becomes enabled for use during a wagering game session conducted via the wagering game machine 960. For instance, the system 900 detects that a wagering game session is in progress for the player account on the wagering game machine 960 and the system 900 also detects that a communications link is established with the mobile device 940 during the wagering game session. The system 900 determines that the player account is associated with the mobile device 940 in response to detection that communication link is established. The system 900 further detects that the player account is registered for the wagering game tournament (e.g., via a query of the mobile device 940, via a query of the wagering game server 950, etc.).

The flow 800 continues at processing block 806, where the system detects, based on the wagering game content, an accomplishment for the registrant within the wagering game tournament. In some embodiments, the system can detect that the accomplishment occurs while the mobile device is activated for use during the wagering game session (e.g., while the mobile device is proximate to a wagering game machine, while the mobile device is linked to a wagering game controller, etc.).

In FIG. 10, the wagering game machine 960 presents a wagering game 1003. During play of the wagering game 1003, a reel-stop configuration occurs that includes a row of a specific symbol (e.g., the shamrock symbols 1006), which is a winning event for the wagering game 1003 and qualifies as an event that indicates progress, or an accomplishment, in the wagering game tournament for the player account. In some embodiments, when the accomplishment involves an amount of money won, the system 900 can cause a transfer of funds from the wagering game server 950 and/or from the wagering game machine 960 to the mobile device 940.

The flow 800 continues at processing block 808, where the system provides information related to the accomplishment for presentation via the mobile device. For instance, in FIG. 10, after the system 900 detects the accomplishment (e.g., the system 900 detects the reel-stop configuration of the shamrock symbols 1006, the system 900 detects that the registrant wins a monetary prize for the tournament, etc.), the system 900 can present an indication of the accomplishment via the mobile device 940. For instance, in FIG. 10, the application 941 presents a message 1045 that specifies the accomplishment. Furthermore, the application 941 specifies a leaderboard 1046, or other form of ranking, that shows progress in the tournament. The application 941 can indicate other information regarding the tournament, such as a score for the tournament, a handicapping of a player account for the tournament, a countdown to a number of games played and left to go, games in a casino that are part of the tournament, best scores in a day (including rank for the day), when the tournament ends or is anticipated to end, an account balance for a player account, data from a wagering game machine linked with the mobile device (e.g., accomplishments in a wagering game played on the wagering game machine), and so forth.

Referring again generally to FIG. 8, in some embodiments, the system tracks and reports information about the wagering game tournament based on a direct communication link between the mobile device and a wagering game machine. For instance, the system can establish a link between a mobile device and a wagering game machine. The system can track events related to the wagering game tournament (e.g., win events that occur via the wagering game machine) while the mobile device is linked with the wagering game machine. For instance, in some embodiments, the wagering game machine can communicate to the mobile device math models for wagering game content presented via the wagering game machine, amounts of wins of the wagering game machine during a wagering game session, player activity that occurs via primary wagering game content, and other information or events. The mobile device can present any of the information provided by the wagering game machine via the application running on the mobile device. The mobile device can include functionality to transfer funds via the wagering game machine for entry into the wagering game tournament and/or to use funds on the wagering game machine for purchase, or financial transaction, of the entry fee. The mobile device and wagering game machine can interact regarding the purchase. If the wagering game tournament ends when mobile device is linked to the wagering game machine, the wagering game machine can pay awards for the wagering game tournament to the mobile device via the communications link.

In some embodiments, the system tracks and reports information about the wagering game tournament based on a communication with a gaming device other than a wagering game machine, such as a central gaming controller or a server that manages the tournament. For example, a server can detect that a player enters a tournament using the mobile device (e.g., detect entry into the tournament using an application of the mobile device). The server can conduct a purchase, or financial transaction, for entry into the tournament initiated by the mobile device. The server can track a number of games played via wagering game machines, via clients connected to the Internet, and so forth. In instances when a player logs in to a wagering game machine, the wagering game machine can communicate math models, winning events, etc., to the server. The server can then communicate information about the tournament to the mobile device for presentation via the application on the mobile device. The server can further determine when a tournament ends and then make payments to the mobile device for winnings related to the tournament. An application on the mobile device can present information received from the server.

Additional Example Embodiments

According to some embodiments, a wagering game system ("system") can provide various example devices, operations, etc., to provide exclusive wagering game content based on activation of a mobile device for use during a wagering game session. The following non-exhaustive list enumerates some possible embodiments.

Using the mobile device for player tracking. In some embodiments, the system utilizes a mobile device linked to a wagering game device for tracking player activities. For instance, as described previously, the mobile device can interact with a wagering game device, via a communication link, to conduct financial transactions related to gambling. Other player tracking functionality can include, but not be limited to, tracking a history of play, tracking player preferences, tracking purchases of a player for non-wagering activities, etc. The mobile device can access a player account for an account based wagering system and communicate account information.

Linking a Mobile Device to Multiple Wagering Game Devices. In some embodiments, the system concurrently connects a mobile device to multiple wagering game devices. For example, in some embodiments, the system concurrently establishes and maintains multiple communication links between a mobile device, a wagering game machine, and a wagering game server. In some embodiments, the system concurrently establishes and maintains multiple communication links between a mobile device and multiple wagering game machines. For instance, a single mobile device may be registered at multiple wagering game machines for concurrently conducted wagering game sessions. The mobile device can present specific features that normally would not be available at one or more of the wagering game machines.

Linking Multiple Mobile Devices to a Single Wagering Game Device. In some embodiments, the system connects multiple mobile devices to a single wagering game device. For example, for team play or for wagering games where there may be a shared outcome, shared credits, etc., the system can establish and maintain multiple communications links with mobile devices for a single wagering game machine or server. The wagering game device can provide content to the multiple mobile devices concurrently.

Providing Content to a Mobile Device after the Mobile Device Unlinks from a Wagering Game Machine. In some embodiments, when a mobile device unlinks from a wagering game machine, the system can continue to provide content to the mobile device via a communication link with a wagering game server. Because the mobile device had as some point in time been connected to the wagering game machine, the mobile device becomes eligible to receive content from the wagering game server. The content provided by the wagering game server is content that normally would not be available to the mobile device but that is now available to the mobile device because of its previous connection with a wagering game machine. The content can include wagering game content that is available while the mobile device is within a casino or within a geographic location with jurisdictional rules that allow wagering games to be played outside a casino. When the mobile device leaves the location where gambling is allowed, the wagering game server can still provide content, or access to content, that does not have wagering features or that has wagering features disabled.

Example Operating Environments

This section describes example operating environments, systems, networks, etc. and presents structural aspects of some embodiments.

Wagering Game System Architecture

Figure 11:
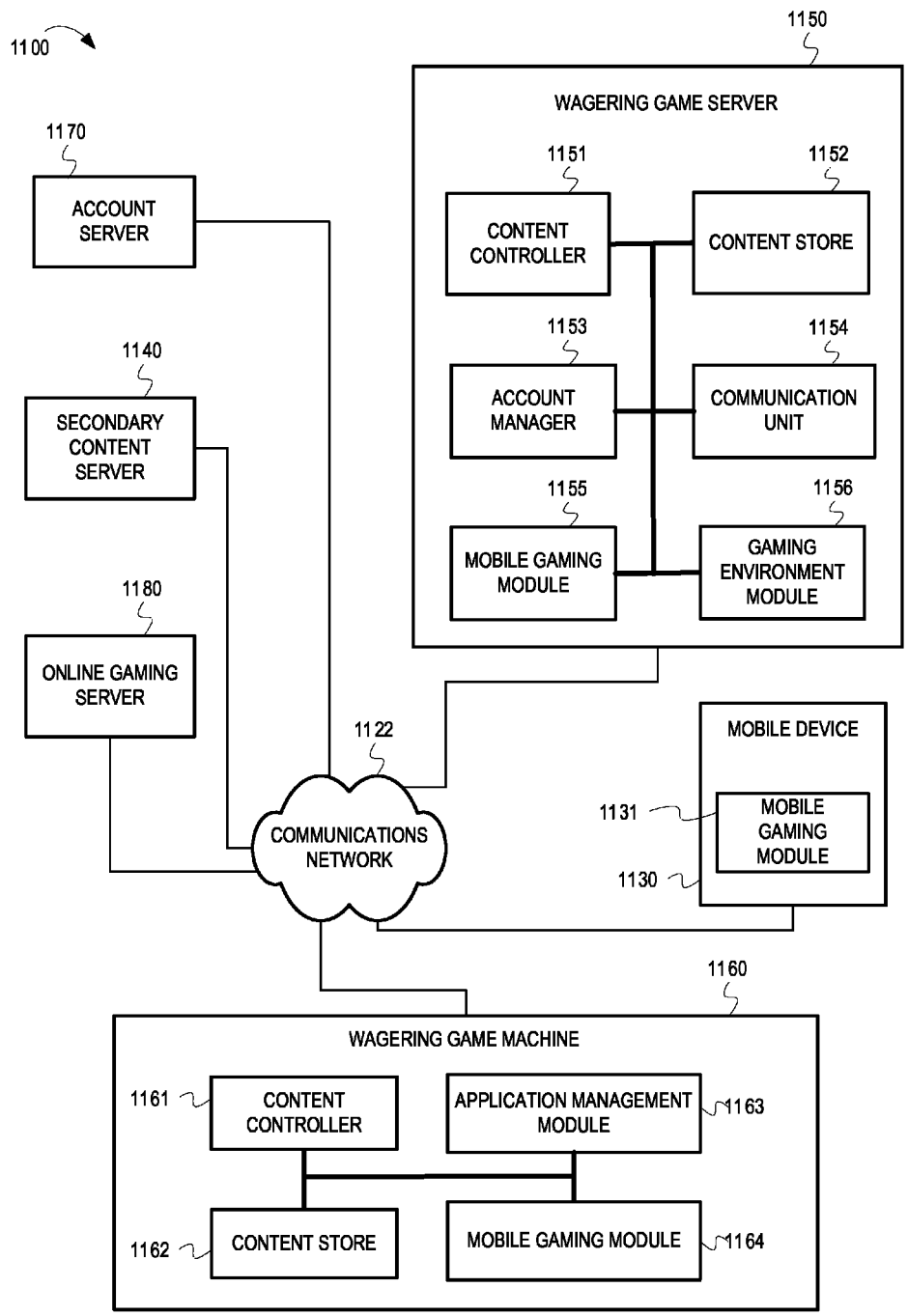
FIG. 11 is an illustration of a wagering game system architecture 1100, according to some embodiments.

FIG. 11 is a conceptual diagram that illustrates an example of a wagering game system architecture 1100, according to some embodiments. The wagering game system architecture 1100 can include an account server 1170 configured to control user related accounts accessible via wagering game networks and social networking networks. The account server 1170 can store wagering game player account information, such as account settings (e.g., settings related to group games, etc., settings related to social contacts, etc.), preferences (e.g., player preferences regarding content presentable via an application of a mobile device, player preferences regarding award types, preferences related to virtual assets, etc.), player profile data (e.g., name, avatar, screen name, etc.), and other information for a player's account (e.g., financial information, account identification numbers, virtual assets, social contact information, etc.). The account server 1170 can contain lists of social contacts referenced by a player account. The account server 1170 can also provide auditing capabilities, according to regulatory rules. The account server 1170 can also track performance of players, machines, and servers.

The wagering game system architecture 1100 can also include a wagering game server 1150 configured to control wagering game content, provide random numbers, and communicate wagering game information, account information, and other information to and from a wagering game machine 1160. The wagering game server 1150 can include a content controller 1151 configured to manage and control content for presentation on the wagering game machine 1160. For example, the content controller 1151 can generate game results (e.g., win/loss values), including win amounts, for games played on the wagering game machine 1160. The content controller 1151 can communicate the game results to the wagering game machine 1160. The content controller 1151 can also generate random numbers and provide them to the wagering game machine 1160 so that the wagering game machine 1160 can generate game results. The wagering game server 1150 can also include a content store 1152 configured to contain content to present on the wagering game machine 1160. The wagering game server 1150 can also include an account manager 1153 configured to control information related to player accounts. For example, the account manager 1153 can communicate wager amounts, game results amounts (e.g., win amounts), bonus game amounts, etc., to the account server 1170. The wagering game server 1150 can also include a communication unit 1154 configured to communicate information to the wagering game machine 1160 and to communicate with other systems, devices and networks. The wagering game server 1150 can also include a mobile gaming module 1155 configured to establish a communications link with a mobile device 1130, and provide exclusive wagering game features and/or content to the mobile device 1130 during a wagering game session in response to the mobile device 1130 being activated for presentation of the wagering game content during the wagering game session (e.g., in response to the mobile device 1130 being linked to the wagering game machine 1160, the wagering game server 1150, the secondary content server, 1140, the account server 1170, and/or the online gaming server 1180). The wagering game server 1150 can also include a gaming environment module 1156 configured to present environmental light and sound effects in a casino environment. The gaming environment module 1156 is further configured to provide content data, user data, and control information regarding gaming effects within a casino environment. For example, the gaming environment module 1156 can coordinate a synchronized presentation of lighting and sound effects across a bank of wagering game machines and/or other lighting and sound producing devices within one or more areas of a casino. The gaming environment module 1156 can also be configured to detect gaming events, such as events generated by the wagering game server 1150 and/or the wagering game machine 1160. The gaming environment module 1156 can generate data for a synchronized light/sound show based on the gaming events. The gaming environment module 1156 can control environmental light presentation devices within a casino. The gaming environment module 1156 can provide emotive lighting presentation data, including light presentation commands on emotive lighting devices on or near wagering game machines, as well as other devices within the casino such as spotlights, overhead emotive lighting, projectors, etc. The gaming environment module 1156 can be configured to determine multi-media, casino-content, including casino-wide special effects that include sound effects and light effects. The multi-media casino content can be presentable across a plurality of casino content presentation devices ("presentation devices") in a casino. The multi-media, casino-content effect can be related to a wagering game presentation or event. The wagering game presentation or event can be tied to the functionality, activity, or purpose of a wagering game. For instance, wagering game presentations can be related to attracting wagering game players to groups of wagering game machines, presenting game related outcomes across multiple wagering game machines, expressing group gaming activity across multiple wagering game machines, focusing attention on a particular person or machine in response to a gaming event, etc. The presentation devices present sound and light effects that accompany a gaming event (e.g., a jackpot celebratory effect that focuses on a wagering game machine, a lightning strike that introduces a community gaming event, and a musical chair game that reveals a community wagering game winner). The gaming environment module 1156 can also be configured to determine timing control data for the multi-media effect. In some embodiments, timing control data can be stored on the wagering game server 1150, or be accessible to the gaming environment module 1156 via another device (e.g., a lighting controller associated with a bank of wagering game machines), to use to send lighting commands in sequential order to network addresses of presentation device on a casino network. The gaming environment module 1156 can determine channels assigned with casino-content presentation devices, such as the wagering game machine 1160. In some embodiments, the presentation devices can have addresses assigned to a channel. For example, the wagering game machine 1160 could be on one channel, peripheral devices could be on another channel, network light presentation devices can be on other channels, etc. In some embodiments, the gaming environment module 1156 can be a DMX controller connected in parallel to an emotive lighting controller on, or associated with, the wagering game machine 1160. The DMX controller can also be connected in parallel to a plurality of other presentation devices (e.g., other wagering game machines, lighting presentation devices, etc.) within a casino, and can simultaneously provide DMX lighting commands to the wagering game machine 1160 and to the other presentation devices. DMX can change light intensity, or other light characteristics, over time. Some embodiments of DMX controllers can update commands very quickly (e.g., 30-47 times a second) across multiple channels (e.g., 512 channels). A DMX controller can put different commands in every channel (e.g., one channel can have show "X," one channel can have show "Y," etc.). The DMX can also have a frame number within a show. Some devices can take up more than one channel (e.g., an emotive light might have three colors and may take up a channel for each color, a spotlight might have seven channels, etc.). Each device can receive 512 bytes of data from the DMX controller at any given time interval (e.g., frame). The 512 bytes of data can be divided in different ways. For example, 6 bytes may address light effect behavior, 6 bytes may include show numbers, 6 bytes may include frame numbers, 1 byte may include priority values, and so on for various light effect characteristics (e.g., intensity, color, pan, tilt, etc.). The presentation device that receives the DMX command data is programmed to interpret the lighting data in the channel. In some embodiments, the presentation devices can be DMX compliant including having a DMX input port to accept DMX commands. In some embodiments, presentation devices can convert the DMX commands to proprietary commands. In addition to the DMX protocol, other types of dedicated lighting protocols can include AMX 192, CMX, SMX, PMX, protocols included in the EIA-485 standard, etc.

The wagering game system architecture 1100 can also include the wagering game machine 1160 configured to present wagering games and receive and transmit information between the wagering game machine 1160 and the mobile device 1130. The wagering game machine 1160 can include a content controller 1161 configured to manage and control content and presentation of content on the wagering game machine 1160. The wagering game machine 1160 can also include a content store 1162 configured to contain content to present on the wagering game machine 1160. The wagering game machine 1160 can also include an application management module 1163 configured to manage multiple instances of gaming applications. For example, the application management module 1163 can be configured to launch, load, unload and control applications and instances of applications. The application management module 1163 can launch different software players (e.g., a Microsoft® Silverlight™ player, an Adobe® Flash® player, etc.) and manage, coordinate, and prioritize what the software players do. The application management module 1163 can also coordinate instances of server applications in addition to local copies of applications. The application management module 1163 can control window locations on a wagering game screen or display for the multiple gaming applications. In some embodiments, the application management module 1163 can manage window locations on multiple displays including displays on devices associated with and/or external to the wagering game machine 1160 (e.g., a top display and a bottom display on the wagering game machine 1160, a peripheral device connected to the wagering game machine 1160, a mobile device connected to the wagering game machine 1160, etc.). The application management module 1163 can manage priority or precedence of client applications that compete for the same display area. For instance, the application management module 1163 can determine each client application's precedence. The precedence may be static (i.e. set only when the client application first launches or connects) or dynamic. The applications may provide precedence values to the application management module 1163, which the application management module 1163 can use to establish order and priority. The precedence, or priority, values can be related to tilt events, administrative events, primary game events (e.g., hierarchical, levels, etc.), secondary game events, local bonus game events, advertising events, etc. As each client application runs, it can also inform the application management module 1163 of its current presentation state. The applications may provide presentation state values to the application management module 1163, which the application management module 1163 can use to evaluate and assess priority. Examples of presentation states may include celebration states (e.g., indicates that client application is currently running a win celebration), playing states (e.g., indicates that the client application is currently playing), game starting states (e.g., indicates that the client application is showing an invitation or indication that a game is about to start), status update states (e.g., indicates that the client application is not 'playing' but has a change of status that should be annunciated, such as a change in progressive meter values or a change in a bonus game multiplier), idle states (e.g., indicates that the client application is idle), etc. In some embodiments, the application management module 1163 can be pre-configurable. The system can provide controls and interfaces for operators to control screen layouts and other presentation features for the configuring of the application management module 1163. The application management module 1163 can communicate with, and/or be a communication mechanism for, a base game stored on a wagering game machine. For example, the application management module 1163 can communicate events from the base game such as the base game state, pay line status, bet amount status, etc. The application management module 1163 can also provide events that assist and/or restrict the base game, such as providing bet amounts from secondary gaming applications, inhibiting play based on gaming event priority, etc. The application management module 1163 can also communicate some (or all) financial information between the base game and other applications including amounts wagered, amounts won, base game outcomes, etc. The application management module 1163 can also communicate pay table information such as possible outcomes, bonus frequency, etc. In some embodiments, the application management module 1163 can control different types of applications. For example, the application management module 1163 can perform rendering operations for presenting applications of varying platforms, formats, environments, programming languages, etc. For example, the application management module 1163 can be written in one programming language format (e.g., JavaScript, Java, C++, etc.) but can manage, and communicate data from, applications that are written in other programming languages or that communicate in different data formats (e.g., Adobe® Flash®, Microsoft® Silverlight™, Adobe® Air™, hyper-text markup language, etc.). The application management module 1163 can include a portable virtual machine capable of generating and executing code for the varying platforms, formats, environments, programming languages, etc. The application management module 1163 can enable many-to-many messaging distribution and can enable the multiple applications to communicate with each other in a cross-manufacturer environment at the client application level. For example, multiple gaming applications on a wagering game machine may need to coordinate many different types of gaming and casino services events (e.g., financial or account access to run spins on the base game and/or run side bets, transacting drink orders, tracking player history and player loyalty points, etc.). The wagering game machine 1160 can also include a mobile gaming module 1164 configured to detect mobile device information from the mobile device 1130 and transmit exclusive wagering-game content to the mobile device 1130. In some embodiments, the mobile gaming module 1164 detects that the mobile device 1130 is enabled for use during a wagering game session and, in response, enables additional wagering game features that are not normally available by default.

The wagering game system architecture 1100 can also include the secondary content server 1140 configured to provide content and control information for secondary games and other secondary content available on a wagering game network (e.g., secondary wagering game content, promotions content, advertising content, player tracking content, web content, etc.). The secondary content server 1140 can provide "secondary" content, or content for "secondary" games presented on the wagering game machine 1160. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content can be in one or more different formats, such as Adobe® Flash®, Microsoft® Silverlight™, Adobe® Air™, hyper-text markup language, etc. In some embodiments, the secondary content server 1140 can provide and control content for community games, including networked games, social games, competitive games, or any other game that multiple players can participate in at the same time. In some embodiments, the secondary content server 1140 can control and present an online website that hosts wagering games. The secondary content server 1140 can also be configured to present multiple wagering game applications on the wagering game machine 1160 via a wagering game website, or other gaming-type venue accessible via the Internet. The secondary content server 1140 can host an online wagering website and/or a social networking website. The secondary content server 1140 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The secondary content server 1140 can also be configured to provide content presentable via an application of the mobile device 1130. In some embodiments, the secondary content server 1140 can also host social networking accounts, provide social networking content, control social networking communications, store associated social contacts, etc. The secondary content server 1140 can also provide chat functionality for a social networking website, a chat application, or any other social networking communications mechanism. In some embodiments, the secondary content server 1140 can utilize player data to determine marketing promotions that may be of interest to a player account. The secondary content server 1140 can also analyze player data and generate analytics for players, group players into demographics, integrate with third party marketing services and devices, etc. The secondary content server 1140 can also provide player data to third parties that can use the player data for marketing. In some embodiments, the secondary content server 1140 can provide one or more social networking communication mechanisms that publish (e.g., post, broadcast, etc.) a message to a mass (e.g., to multiple people, users, social contacts, accounts, etc.). The social networking communication mechanism can publish the message to the mass simultaneously. Examples of the published message may include, but not be limited to, a blog post, a mass message post, a news feed post, a profile status update, a mass chat feed, a mass text message broadcast, a video blog, a forum post, etc. Multiple users and/or accounts can access the published message and/or receive automated notifications of the published message.

The wagering game system architecture 1100 can also include the online gaming server 1180 configured to control and present a website that hosts gaming related content (e.g., wagering games, non-wagering games that share common themes to wagering games, social networking content related to gaming, etc.). The online gaming server 1180 can be configured to present multiple applications on the website via the Internet. The online gaming server 1180 can host a social network. The online gaming server 1180 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The online gaming server 1180 can also be configured to provide content presentable via an application of the mobile device 1130.

The wagering game system architecture 1100 can also include the mobile device 1130 configured to control mobile communications and applications. The mobile device 1130 may also be referred to as a handheld device, a handheld computer or simply handheld. In some embodiments, the mobile device 1130 is a pocket-sized computing device, having a display screen with touch input and/or a miniature keyboard. Some examples of the mobile device 1130 may include, but are not limited to, a smartphone, a personal digital assistant, a mobile computer, a mobile internet device, a portable media player, a mobile phone, a pager, a personal navigation device, etc. In some embodiments, the mobile device 1130 functions via a wireless application protocol (WAP). In some embodiments, the mobile device 1130 may include integrated data capture devices like barcode readers, radio frequency identification (RFID) readers, In-cell Optical LCD readers, and smart card readers. In some embodiments the mobile device 1130 is personal (i.e., belongs to a user), which the user can carry on their person. The mobile device 1130 can include a mobile gaming module 1131 configured to communicate with wagering game devices, such as the wagering game server 1150, the wagering game machine 1160, the online gaming server 1180, the secondary content server 1140, and the account server 1170. Further, the mobile gaming module 1131 is configured to provide information about the mobile device 1130 to the wagering game devices. In some embodiments, the mobile gaming module 1131 is further configured to receive exclusive wagering game content from the wagering game devices in response to being activated for use during a wagering game session (e.g., in response to establishing a communications link with one or more of the wagering game devices). The mobile gaming module 1130 is further configured to present content related to gaming, via an application of the mobile device 1130, while the mobile device 1130 is inside or outside a casino.

Each component shown in the wagering game system architecture 1100 is shown as a separate and distinct element connected via a communications network 1122. However, some functions performed by one component could be performed by other components. For example, the wagering game server 1150 can also be configured to perform functions of the application management module 1163, and other network elements and/or system devices. Furthermore, the components shown may all be contained in one device, but some, or all, may be included in, or performed by, multiple devices, as in the configurations shown in FIG. 11 or other configurations not shown. For example, the account manager 1153 and the communication unit 1154 can be included in the wagering game machine 1160 instead of, or in addition to, being a part of the wagering game server 1150. Further, in some embodiments, the wagering game machine 1160 can determine wagering game outcomes, generate random numbers, etc. instead of, or in addition to, the wagering game server 1150.

The wagering game machines described herein (e.g., wagering game machine 1160) can take any suitable form, such as floor standing models, handheld mobile wagering game machines, bar-top models, workstation-type console models, surface computing machines, etc. Further, wagering game machines can be primarily dedicated for use in conducting wagering games.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 1100 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Computer Architecture

Figure 12:
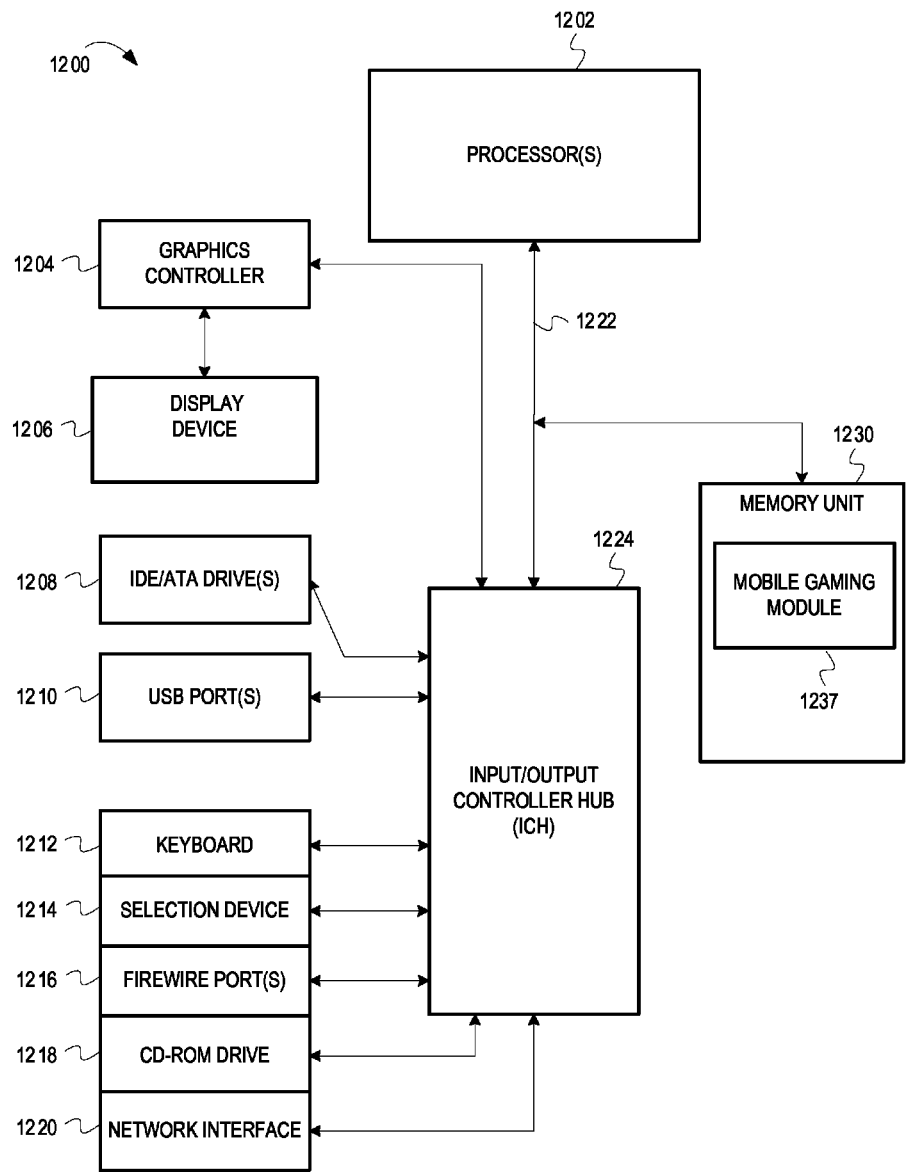
FIG. 12 is an illustration of a computer architecture, according to some embodiments.

FIG. 12 is a conceptual diagram that illustrates an example of a computer architecture, according to some embodiments. In FIG. 12, the wagering game computer system ("computer system") 1200 may include a processor unit 1202, a memory unit 1230, a processor bus 1222, and an Input/Output controller hub (ICH) 1224. The processor unit 1202, memory unit 1230, and ICH 1224 may be coupled to the processor bus 1222. The processor unit 1202 may comprise any suitable processor architecture. The computer system 1200 may comprise one, two, three, or more processors, any of which may execute a set of instructions in accordance with some embodiments.

The memory unit 1230 may also include an I/O scheduling policy unit and I/O schedulers. The memory unit 1230 can store data and/or instructions, and may comprise any suitable memory, such as a dynamic random access memory (DRAM), for example. The computer system 1200 may also include one or more suitable integrated drive electronics (IDE) drive(s) 1208 and/or other suitable storage devices. A graphics controller 1204 controls the display of information on a display device 1206, according to some embodiments.

The ICH 1224 provides an interface to I/O devices or peripheral components for the computer system 1200. The ICH 1224 may comprise any suitable interface controller to provide for any suitable communication link to the processor unit 1202, memory unit 1230 and/or to any suitable device or component in communication with the ICH 1224. The ICH 1224 can provide suitable arbitration and buffering for each interface.

For one embodiment, the ICH 1224 provides an interface to the one or more IDE drives 1208, such as a hard disk drive (HDD) or compact disc read only memory (CD ROM) drive, or to suitable universal serial bus (USB) devices through one or more USB ports 1210. For one embodiment, the ICH 1224 also provides an interface to a keyboard 1212, selection device 1214 (e.g., a mouse, trackball, touchpad, etc.), CD-ROM drive 1218, and one or more suitable devices through one or more firewire ports 1216. For one embodiment, the ICH 1224 also provides a network interface 1220 through which the computer system 1200 can communicate with other computers and/or devices.

The computer system 1200 may also include a machine-readable storage medium that stores a set of instructions (e.g., software) embodying any one, or all, of the methodologies to provide wagering game content for a mobile device. Furthermore, software can reside, completely or at least partially, within the memory unit 1230 and/or within the processor unit 1202. The computer system 1200 can also include a mobile gaming module 1237. The mobile gaming module 1237 can process communications, commands, or other information, to provide wagering game content for a mobile device. Any component of the computer system 1200 can be implemented as hardware, firmware, and/or machine-readable storage media including instructions for performing the operations described herein.

Wagering Game Machine Architecture

Figure 13:
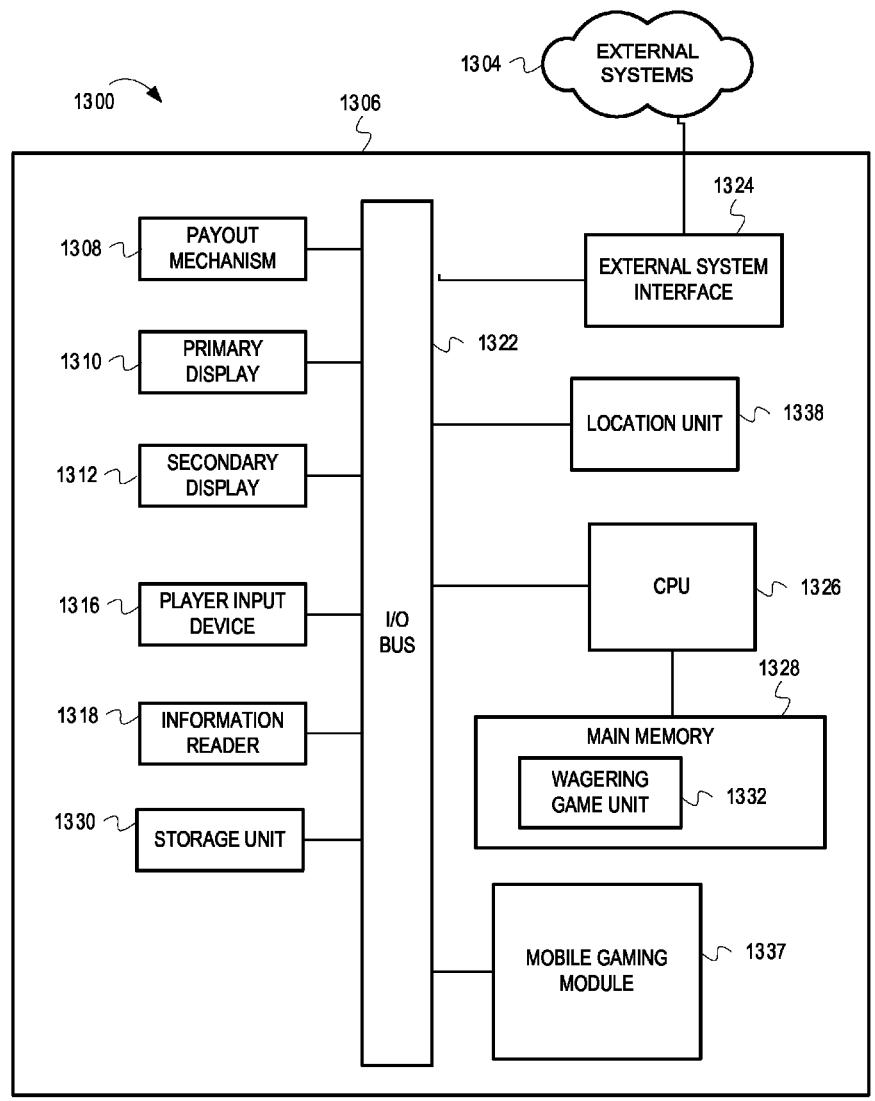
FIG. 13 is an illustration of a wagering game machine architecture 1300, according to some embodiments.

FIG. 13 is a conceptual diagram that illustrates an example of a wagering game machine architecture 1300, according to some embodiments. In FIG. 13, the wagering game machine architecture 1300 includes a wagering game machine 1306, which includes a central processing unit (CPU) 1326 connected to main memory 1328. The CPU 1326 can include any suitable processor, such as an Intel® Pentium processor, Intel® Core 2 Duo processor, AMD Opteron™ processor, or UltraSPARC processor. The main memory 1328 includes a wagering game unit 1332. In some embodiments, the wagering game unit 1332 can present wagering games, such as video poker, video black jack, video slots, video lottery, reel slots, etc., in whole or part.

The CPU 1326 is also connected to an input/output ("I/O") bus 1322, which can include any suitable bus technologies, such as an AGTL+ frontside bus and a PCI backside bus. The I/O bus 1322 is connected to a payout mechanism 1308, primary display 1310, secondary display 1312, player input device 1316, information reader 1318, and storage unit 1330. The I/O bus 1322 is also connected to an external system interface 1324, which is connected to external systems 1304 (e.g., wagering game networks). The external system interface 1324 can include logic for exchanging information over wired and wireless networks (e.g., 802.11g transceiver, Bluetooth transceiver, Ethernet transceiver, etc.)

The I/O bus 1322 is also connected to a location unit 1338. The location unit 1338 can create player information that indicates the wagering game machine's location/movements in a casino. In some embodiments, the location unit 1338 includes a global positioning system (GPS) receiver that can determine the wagering game machine's location using GPS satellites. In other embodiments, the location unit 1338 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 13, in some embodiments, the location unit 1338 is not connected to the I/O bus 1322.

In some embodiments, the wagering game machine 1306 can include additional peripheral devices and/or more than one of each component shown in FIG. 13. For example, in some embodiments, the wagering game machine 1306 can include multiple external system interfaces 1324 and/or multiple CPUs 1326. In some embodiments, any of the components can be integrated or subdivided.

In some embodiments, the wagering game machine 1306 includes a mobile gaming module 1337. The mobile gaming module 1337 can process communications, commands, or other information, where the processing can provide wagering game content for a mobile device.

Furthermore, any component of the wagering game machine 1306 can include hardware, firmware, and/or machine-readable storage media including instructions for performing the operations described herein.

Wagering Game System

Figure 14:
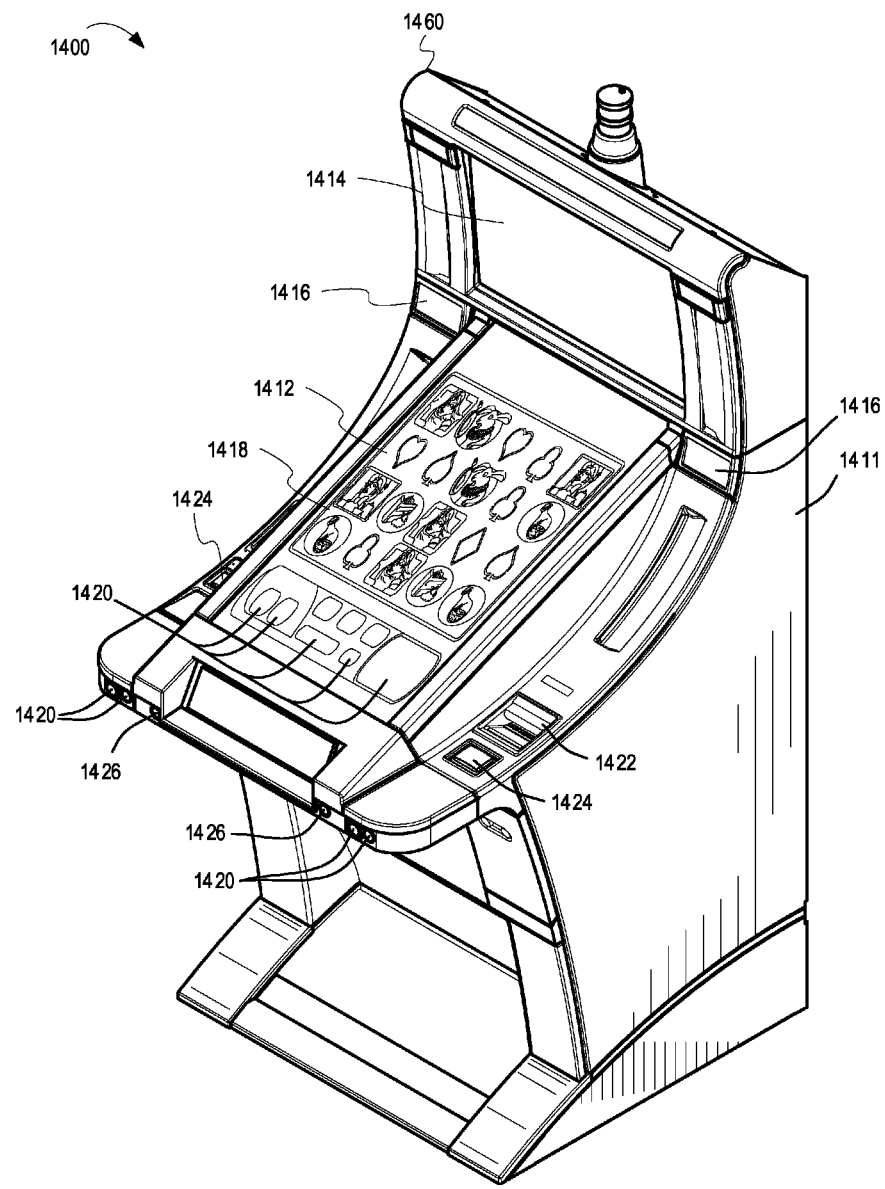
FIG. 14 is an illustration of a wagering game system 1400, according to some embodiments.

FIG. 14 is a conceptual diagram that illustrates an example of a wagering game system 1400, according to some embodiments. In FIG. 14, the wagering game system 1400 includes a wagering game machine 1460 similar to those used in gaming establishments, such as casinos. The wagering game machine 1460 may, in some examples, be referred to as a gaming terminal or an electronic gaming machine. The wagering game machine 1460 may have varying structures and methods of operation. For example, the wagering game machine 1460 may include electromechanical components configured to play mechanical slots. In another example, the 1460 includes electronic components configured to play a video casino game, such as slots, keno, poker, blackjack, roulette, craps, etc. The wagering game machine 1460 is depicted as a floor-standing model. However, other examples of wagering game machines include handheld mobile units, bartop models, workstation-type console models, etc. Further, the wagering game machine 1460 may be primarily dedicated for use in conducting wagering games, or may include non-dedicated devices, such as mobile phones, personal digital assistants, personal computers, etc. Exemplary types of wagering game machines are disclosed in U.S. Pat. No. 6,517,433 and Patent Application Publication Nos. US2010/0062196 and US2010/0234099, which are incorporated herein by reference in their entireties.

The wagering game machine 1460 illustrated in FIG. 14 comprises a cabinet 1411 that may house various input devices, output devices, and input/output devices. By way of example, the wagering game machine 1460 includes a primary display area 1412, a secondary display area 1414, and one or more audio speakers 1416. The primary display area 1412 or the secondary display area 1414 may include one or more of a cathode ray tube (CRT), a high resolution liquid crystal display (LCD), a plasma display, a light emitting diode (LED) display, a three-dimensional (3D) display, a video display, or a combination thereof. In some examples, the primary display area 1412 or the secondary display area 1414 includes mechanical reels to display a wagering game outcome. In some example, the primary display area 1412 or the secondary display area 1414 present a transmissive video display disposed in front of a mechanical-reel display to portray a video image superimposed upon the mechanical-reel display. In FIG. 14, the wagering game machine 1460 is a "slant-top" version in which the primary display 1412 is slanted (e.g., at about a thirty-degree angle toward the player of the wagering game machine 1460). Another example of wagering game machine 1460 is an "upright" version in which the primary display 1414 is oriented vertically relative to the player. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the wagering game machine 1460. The wagering game machine 1460 includes a touch screen(s) 1418 mounted over the primary or secondary areas, buttons 1420 on a button panel, bill validator 1422, information reader/writer(s) 1424, and player-accessible port(s) 1426 (e.g., audio output jack for headphones, video headset jack, USB port, wireless transmitter/receiver, etc.). It should be understood that numerous other peripheral devices and other elements exist and are readily utilizable in any number of combinations to create various forms of a wagering game machine in accord with the present concepts.

Input devices, such as the touch screen 1418, buttons 1420, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a machine-readable storage medium having stored thereon instructions, which may be used to program a computer system to perform a process according to embodiments(s), whether presently described or not, because every conceivable variation is not enumerated herein. A machine-readable storage medium includes any mechanism that stores information in a form (e.g., software, processing application) readable by a machine (e.g., a computer). For example, machine-readable storage media includes magnetic storage medium (e.g., floppy diskette), read only memory (ROM), random access memory (RAM), magnetic disk storage media, optical storage media (e.g., CD-ROM), magneto-optical storage media, flash memory, erasable programmable memory (e.g., EPROM and EEPROM), or other types of media suitable for storing electronic instructions. In addition, embodiments may be embodied in a machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method of operating a gaming system configured to provide one or more casino wagering games, said method comprising:

establishing, via a network communication interface of the gaming system, a network communication link between the gaming system and a mobile device separate from the gaming system, wherein the gaming system is configured to present primary wagering game content for the one or more casino wagering games via one or more electronic display devices of the gaming system, and wherein the gaming system includes a value input device configured to receive monetary input for placement of wagers on the one or more casino wagering games;

electronically selecting, from a memory storage unit of the gaming system, secondary wagering game content after establishing the network communication link with the mobile device;

providing, via the network communication interface, the secondary wagering game content to the mobile device via the network communication link; and in response to the providing of the secondary wagering game content to the mobile device, modifying, via one or more electronic processing units of the gaming system, the primary wagering game content to cause a default theoretical payout percentage for the one or more casino wagering games to reduce in value related to a portion of the default theoretical payout percentage electronically apportioned to the secondary wagering game content.

2. The method of claim 1 further comprising:
determining that an application is active on the mobile device, wherein the application is configured to present the secondary wagering game content.

3. The method of claim 1, wherein the secondary wagering game content provides a wagering game feature that is not available via the primary wagering game content, and wherein the wagering game feature includes one or more of a bonus game associated with the primary wagering game content and a progressive wagering game.

4. The method of claim 1 further comprising:
detecting a wagering activity performed via the secondary wagering game content via the mobile device; and
in response to the wagering activity performed via the mobile device, modifying parameters of the primary wagering game content to cause the default theoretical payout percentage to reduce in value.

5. The method of claim 1 further comprising:
detecting that the mobile device is within a proximity range to the gaming system; and
establishing the network communication link between the gaming system and the mobile device in response to the detecting that the mobile device is within the proximity range to the gaming system.

6. The method of claim 1 further comprising:
detecting an accomplishment for a wagering game tournament via the primary wagering game content; and
providing a message to the mobile device, in the secondary wagering game content, regarding the accomplishment.

7. The method of claim 1, further comprising:
providing third content to the mobile device via the network communication link, wherein the third content is configured to be presented via the mobile device after the network communication link is terminated.

8. A gaming system comprising:
one or more processors;
at least one electronic display device configured to present one or more casino wagering games;
at least one communication device configured to communicate with a mobile device separate from the gaming system;
at least one gaming unit configured to provide random game outcomes for wagers placed on the one or more casino wagering games presented via the gaming system;
a value input device configured to receive monetary value for placement of wagers on the one or more casino wagering games; and
at least one memory unit configured to store instructions which, when executed by at least one of the one or more processors, cause the gaming system to
establish, via the at least one communication device, a communication link between the mobile device and the gaming system, wherein first wagering game content for the one or more casino wagering games has a first theoretical payout percentage,
electronically detect an event that occurs via presentation of the first wagering game content,
in response to detection of the event, electronically modify the first wagering game content to reduce the first theoretical payout percentage for the first wagering game content to a second theoretical payout percentage, and
provide, via the at least one communication device, second wagering game content to the mobile device via the communication link, wherein the second wagering game content has a third theoretical payout percentage less than the first theoretical payout percentage, wherein the third theoretical payout percentage is apportioned to the second wagering game content according to an amount to which the first theoretical payout percentage is reduced.

9. The gaming system of claim 8, wherein the at least one memory unit is configured to store instructions which, when executed by the at least one of the one or more processors, further cause the gaming system to
electronically modify the first wagering game content so that the second theoretical payout percentage is a first portion of the first theoretical payout percentage, wherein the first portion of the first theoretical payout percentage is less than the first theoretical payout percentage, and
provide the second wagering game content so that the third theoretical payout percentage is a second portion of the first theoretical payout percentage, wherein the second portion of the first theoretical payout percentage is less than the first theoretical payout percentage.

10. The gaming system of claim 8, wherein the at least one memory unit configured to store instructions to electronically modify the first wagering game content is configured to store instructions which, when executed by the at least one of the one or more processors, cause the gaming system to one or more of replace a stored value for the first theoretical payout percentage with a value of the second theoretical payout percentage, modify a parameter related to an expected value for the first wagering game content, decrease a probability of occurrence of at least one winning wagering game event of the first wagering game content, decrease a potential win amount of at least one winning wagering game event of the first wagering game content, and replace a math table for the first wagering game content.

11. The gaming system of claim 8, wherein the at least one memory unit is configured to store instructions which, when executed by the at least one of the one or more processors, further cause the gaming system to detect that the communication link is established between the gaming system and the mobile device during a wagering game session.

12. The gaming system of claim 8, wherein the at least one memory unit is configured to store instructions which, when executed by the at least one of the one or more processors, further cause the gaming system to establish the communication link between the gaming system and the mobile device via one or more of a Wi-Fi network within a wagering game venue, Bluetooth communication with the mobile device, a near-field communication with the mobile device, and a direct connection with the mobile device.

13. A gaming apparatus comprising:
at least one processor;
at least one electronic display device configured to present one or more casino wagering games;
at least one network communication interface configured to communicate with a mobile device separate from the gaming apparatus;
a value input device configured to receive monetary value for placement of wagers on the one or more casino wagering games; and
a memory unit configured to store instructions which, when executed by the at least one processor, cause the gaming apparatus to
establish a communication link between the mobile device and the gaming apparatus via the at least one network communication interface, wherein the gaming apparatus is configured to present wagering game content used for a wagering game tournament, detect that the mobile device is associated with a registrant of the wagering game tournament, detect, in response to an occurrence of an event for the wagering game content, an accomplishment for the registrant within the wagering game tournament, detect, based on the accomplishment, that the registrant wins a monetary prize for the wagering game tournament, and transfer, via the communication link, funds for the monetary prize to an account balance accessible to the mobile device, wherein the transferred funds are accessible for an electronic purchase via the mobile device.

14. The gaming apparatus of claim 13, wherein the memory unit is configured to store instructions which, when executed by the at least one processor, further cause the gaming apparatus to detect, via the communication link, a request to register for the wagering game tournament via the mobile device, and pay a registration fee for the wagering game tournament via funds from the account balance of the gaming apparatus in response to the request.

15. The gaming apparatus of claim 13, wherein the memory unit configured to store the instructions to detect that the mobile device is associated with the registrant of the wagering game tournament, is configured to store instructions, which when executed by the at least one processor, cause the gaming apparatus to detect a player account associated with the mobile device, login the player account, and detect that the player account is registered for the wagering game tournament.

16. The gaming apparatus of claim 13, wherein the mobile device is configured to present one or more of a number of games to play for the wagering game tournament, a number of games that have been played for the wagering game tournament, a remainder of games to be played for the wagering game tournament, a fee for entry into the wagering game tournament, an account balance of a player account associated with the registrant, a result of the wagering game tournament, a leaderboard for the wagering game tournament, a ranking within the wagering game tournament, a handicapping of a player account for the wagering game tournament, games in a casino that are part of the wagering game tournament, best scores for a time period of the wagering game tournament, an anticipated ending time for the wagering game tournament, a score for the wagering game tournament, information received from a wagering game machine, or information received from a wagering game controller.

17. One or more non-transitory, machine-readable storage devices having instructions stored thereon, which when executed by a set of one or more wagering game controllers associated with a wagering game machine cause the set of one or more wagering game controllers to perform operations comprising:

determining that a mobile device is activated for use during a wagering game session, wherein first wagering game content is presented during the wagering game session by at least one electronic display device of the wagering game machine, wherein the mobile device is separate from the wagering game machine, and wherein the wagering game machine includes a value input device configured to receive monetary value for placement of wagers on one or more casino wagering games;

selecting, from a memory storage unit of the wagering game machine, second wagering game content in response to the determining that the mobile device is activated for use during the wagering game session, wherein the second wagering game content provides a wagering game feature that is not available via the first wagering game content;

providing the second wagering game content for presentation via the mobile device, wherein the first wagering game content is funded by first wagers made via the wagering game machine and wherein the second wagering game content is funded by second wagers made via the mobile device; and modifying the first wagering game content to cause a default theoretical payout percentage for the first wagering game content to reduce in value related to a portion of the default theoretical payout percentage electronically apportioned to the second wagering game content.

18. The one or more non-transitory, machine-readable storage devices of claim 17, said operations further comprising:

receiving a message, from the mobile device, that a wagering game activity occurred via the second wagering game content, wherein the wagering game activity causes a monetary payout for the second wagering game content.

19. The one or more non-transitory, machine-readable storage devices of claim 17, wherein the operations further include:

providing third content, for presentation via the mobile device after the wagering game session, based on the mobile device having been activated for use during the wagering game session.

20. A wagering game apparatus comprising:

means for presenting first wagering game content via the wagering game apparatus, wherein the first wagering game content includes at least one wagering game feature;

means for determining that a mobile device is activated for use with the wagering game apparatus, wherein the mobile device is separate from the wagering game apparatus;

means for activating second wagering game content on the mobile device in response to determining that the mobile device is activated for use with the wagering game apparatus, wherein the second wagering game content provides at least one additional wagering game feature in addition to the at least one wagering game feature of the first wagering game content; and means for apportioning a theoretical payout percentage associated with the wagering game apparatus to both the first wagering game content and the second wagering game content.

21. The wagering game apparatus of claim 20, wherein the means for determining that the mobile device is activated for comprises:

means for determining that a communication link is established between the mobile device and the wagering game apparatus.

22. The wagering game apparatus of claim 20, wherein the means for activating the second wagering game content on the mobile device comprises:

means for providing the second wagering game content to the mobile device in response to the determining that the mobile device is activated for use with the wagering game apparatus.

23. The wagering game apparatus of claim 20, wherein the means for activating the second wagering game content on the mobile device comprises:

means for unlocking the at least one additional wagering game feature within the second wagering game content in response to the determining that the mobile device is activated for use with the wagering game apparatus.

24. The wagering game apparatus of claim 20, wherein the means for apportioning the theoretical payout percentage associated with the wagering game apparatus between first wagering game content and the second wagering game content comprises:

means for dividing a default theoretical payout factor, associated with the theoretical payout percentage, into a first portion of the default theoretical payout factor and a second portion of the default theoretical payout factor, wherein the first portion of the default theoretical payout factor and the second portion of the default theoretical payout factor are both less than the default theoretical payout factor, means for apportioning the first portion of the default theoretical payout factor to the first wagering game content; and means for apportioning the second portion of the default theoretical payout factor to the second wagering game content.

25. The wagering game apparatus of claim 24, wherein the means for apportioning the first portion of the default theoretical payout factor to the first wagering game content comprises one or more of means for replacing a stored value for the default theoretical payout factor with a value of the first portion of the default theoretical payout factor, means for causing an expected value for the first wagering game content to decrease, means for decreasing a probability of occurrence of at least one winning wagering game event of the first wagering game content, means for decreasing a potential win amount of at least one winning wagering game event of the first wagering game content, and means for replacing a math table for the first wagering game content to cause lower odds of winning for the first wagering game content.

* * * * *